US012065099B2

(12) United States Patent
Simonelli et al.

(10) Patent No.: US 12,065,099 B2
(45) Date of Patent: Aug. 20, 2024

(54) REMOTE RELEASE, REDUNDANT RESTRAINT LATCH

(71) Applicant: Universal City Studios LLC, Universal City, CA (US)

(72) Inventors: James K. Simonelli, Orlando, FL (US); John D. Wilson, Orlando, FL (US)

(73) Assignee: Universal City Studios LLC, Universal City, CA (US)

(*) Notice: Subject to any disclaimer, the term of this patent is extended or adjusted under 35 U.S.C. 154(b) by 604 days.

(21) Appl. No.: 17/174,009

(22) Filed: Feb. 11, 2021

(65) Prior Publication Data

US 2022/0105895 A1 Apr. 7, 2022

Related U.S. Application Data

(60) Provisional application No. 63/108,725, filed on Nov. 2, 2020, provisional application No. 63/087,513, filed on Oct. 5, 2020.

(51) Int. Cl.
| | | |
|---|---|---|
| *B60R 22/48* | (2006.01) | |
| *A63G 7/00* | (2006.01) | |
| *B60R 22/12* | (2006.01) | |
| *A44B 11/25* | (2006.01) | |
| *B60R 22/32* | (2006.01) | |

(52) U.S. Cl.
CPC ............... *B60R 22/48* (2013.01); *A63G 7/00* (2013.01); *B60R 22/12* (2013.01); *A44B 11/25* (2013.01); *B60R 2022/4816* (2013.01)

(58) Field of Classification Search
CPC ........... A44B 11/00; A44B 11/25; A44B 1/04; A44B 17/00; B60R 22/02; B60R 22/325; B60R 22/32

USPC ........................................ 472/13, 43, 59, 130
See application file for complete search history.

(56) References Cited

U.S. PATENT DOCUMENTS

| | | | |
|---|---|---|---|
| 5,182,836 A | | 2/1993 | Burkat |
| 5,815,895 A | * | 10/1998 | Carlson .................. A44B 11/25 24/641 |
| 6,888,475 B2 | | 5/2005 | Darr |
| 7,657,979 B2 | | 2/2010 | Midorikawa et al. |
| 8,096,027 B2 | | 1/2012 | Jung |
| 8,240,012 B2 | | 8/2012 | Walega et al. |
| 8,327,513 B2 | | 12/2012 | Keene et al. |
| 8,375,530 B2 | | 2/2013 | Walega et al. |
| 8,381,373 B2 | | 2/2013 | Jung |
| 8,627,554 B1 | | 1/2014 | Hagan et al. |
| 9,277,788 B2 | | 3/2016 | Humbert et al. |

(Continued)

OTHER PUBLICATIONS

PCT/US2021/052404 International Search Report and Written Opinion mailed Jan. 20, 2022

*Primary Examiner* — Kien T Nguyen
(74) *Attorney, Agent, or Firm* — Fletcher Yoder P.C.

(57) ABSTRACT

Embodiments of the present disclosure include systems and methods for securing a rider inside a ride vehicle of an amusement park ride. For example, the disclosed systems and methods include a restraint system (e.g., lap belt, harness, restraint bar (e.g., lap bar, shoulder bar), and the like) that includes a locking mechanism that is activated and deactivated remotely. The remote release locking mechanism includes redundant latches (e.g., a primary latch and at least one secondary, redundant latch) and encompasses a relatively small amount of components housed in a relatively small amount of space.

22 Claims, 17 Drawing Sheets

(56) References Cited

U.S. PATENT DOCUMENTS

| | | |
|---|---|---|
| 2005/0145430 A1 | 7/2005 | Smith et al. |
| 2006/0080812 A1* | 4/2006 | O'Brien ................ A44B 11/25 24/633 |
| 2009/0031541 A1 | 2/2009 | Pribonic |
| 2018/0125172 A1 | 5/2018 | Chien et al. |
| 2018/0326311 A1 | 11/2018 | Masterson et al. |
| 2019/0184935 A1 | 6/2019 | Blum |

* cited by examiner

REMOTE RELEASE, REDUNDANT RESTRAINT LATCH

CROSS REFERENCE TO RELATED APPLICATIONS

This application claims priority to U.S. Provisional Application Ser. No. 63/087,513, entitled "REMOTE RELEASE, REDUNDANT RESTRAINT LATCH," filed Oct. 5, 2020, and to U.S. Provisional Application Ser. No. 63/108,725, entitled "REMOTE RELEASE, REDUNDANT RESTRAINT LATCH," filed Nov. 2, 2020, both of which are hereby incorporated by reference in their entireties for all purposes.

BACKGROUND

The present disclosure relates generally to the field of amusement parks. More specifically, embodiments of the present disclosure relate to systems and methods for securing guests inside a ride vehicle of an amusement park ride.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

Various amusement park rides have been created to provide riders with unique motion and visual experiences. For example, amusement park rides can be implemented with single-rider or multi-rider vehicles that travel along a path or that utilize a motion base. Excitement is often created by the speed or change in direction of the vehicles as they move along a ride path or follow a motion routine. For example, the ride path may include a number of features such as, but not limited to, tunnels, turns, ups, downs, loops, and so forth. While the riders are inside the operating ride, they may be subject to forces while the ride is in operation. Accordingly, it may be desirable to restrain and secure riders within the ride vehicle for the duration of the amusement park ride. In addition, it may also be desirable to prevent riders from exiting the ride vehicle to prevent injury to them, for example, by preventing the riders from exiting the ride vehicle in potentially hazardous areas (e.g., areas that are not intended for amusement park guests to be in).

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In certain embodiments, a restraint system includes a restraining mechanism configured to secure a rider with respect to a ride seat. The restraining mechanism includes a first connector. The restraint system also includes a remote release locking mechanism having a plurality of latches that include a first, primary latch and at least one second, redundant latch, wherein the plurality of latches are configured to be individually remotely actuated to lock and unlock the first connector of the restraining mechanism relative to a second connector of the remote release locking mechanism.

In addition, in certain embodiments, an amusement park ride includes one or more ride vehicles. Each ride vehicle includes one or more ride seats. Each ride seat includes a restraining mechanism configured to secure a rider with respect to a ride seat. The restraining mechanism includes a first connector. Each ride seat also includes a remote release locking mechanism having a plurality of latches that include a first, primary latch and at least one second, redundant latch, wherein the plurality of latches are configured to be individually remotely actuated to lock and unlock the first connector of the restraining mechanism relative to a second connector of the remote release locking mechanism.

In addition, in certain embodiments, a remote release locking mechanism includes a first connector and a plurality of latches that include a first, primary latch and at least one second, redundant latch, wherein the plurality of latches are configured to be individually remotely actuated to lock and unlock a second connector of a restraining mechanism relative to the first connector.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments of the disclosure are directed to systems and methods for securing a rider inside a ride vehicle of an amusement park ride. For example, the disclosed systems and methods include a restraint system (e.g., lap belt, harness, restraint bar (e.g., lap bar, shoulder bar), and the like) that includes a locking mechanism that is activated and deactivated remotely. As described in greater detail herein, the remote release locking mechanism includes redundant latches (e.g., a primary latch and at least one secondary, redundant latch) and encompasses a relatively small amount of easily manufactured components housed in a relatively small amount of space. The remote release locking mechanism may be activated at any time after loading and prior to the start of the amusement park ride to secure the rider within the ride vehicle throughout the duration of the amusement park ride. The redundant latches of the remote release locking mechanism may be inaccessible to the rider such that the rider may be unable to prematurely unlock the remote release locking mechanism during operation of the ride. Once the amusement park ride ends, the remote release locking mechanism may be deactivated, for example at an unlocking point at an unloading station, to release the rider from the ride vehicle.

Figure 1:
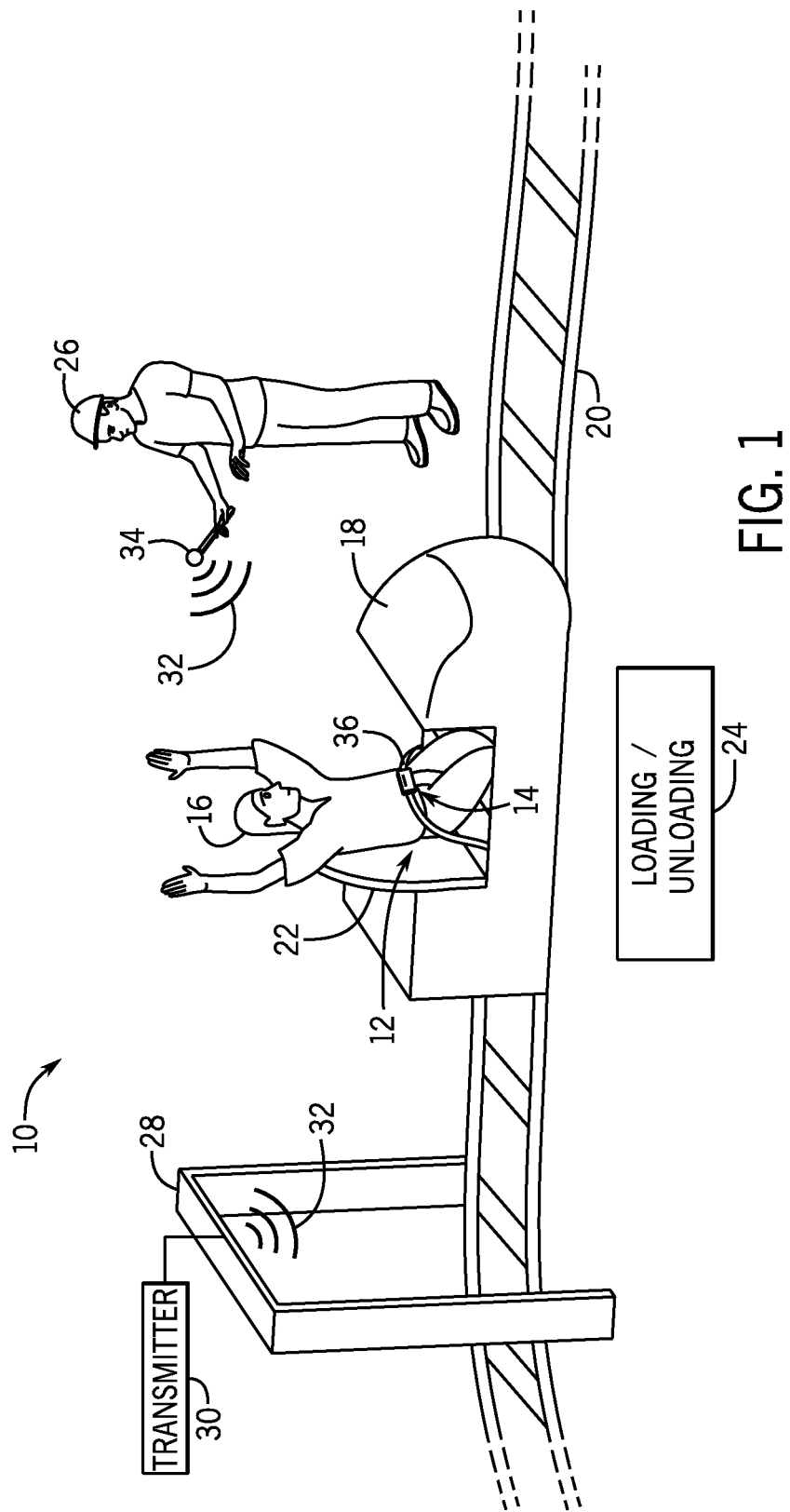
FIG. 1 illustrates an amusement park ride that uses a restraint system having a remote release locking mechanism to secure a rider during operation of the amusement park ride, in accordance with embodiments of the present disclosure.

FIG. 1 illustrates an amusement park ride 10 that uses a restraint system 12 having a remote release locking mechanism 14 to secure a rider 16 during operation of the amusement park ride 10. In the illustrated embodiment, the amusement park ride 10 includes a ride vehicle 18 that travels along a track 20 defining a ride path of the amusement park ride 10. The ride vehicle 18 includes a ride seat 22 that supports the rider 16 within the ride vehicle 18 and the restraint system 12 that secures the rider 16 within the ride seat 22 during operation of the amusement park ride 10.

As discussed in greater detail herein, the restraint system 12 includes the remote release locking mechanism 14 having redundant latches (e.g., a primary latch and at least one secondary, redundant latch) that may be actuated remotely (e.g., via radio frequency or any other suitable electromagnetic signal). For example, the remote release locking mechanism 14 may be actuated at a loading/unloading station 24 to lock or unlock the remote release locking mechanism 14 and secure or release, respectively, the rider 16 within the ride seat 22. The loading/unloading station 24 may include a lock point where the remote release locking mechanism 14 is actuated (e.g., automatically or by a crew member 26) to secure the rider 16 in the ride vehicle 18. In certain embodiments, the loading/unloading station 24 may also include a control point where the crew member 26 may verify that the rider 16 is properly restrained within the ride seat 22. Similarly, the loading/unloading station 24 may include an unlock point where the remote release locking mechanism 14 is deactivated to unlock and release the rider 16 from the ride vehicle 18.

As used herein, the term "loading station" is intended to denote an area where the rider 16 boards the ride vehicle 18 of the amusement park ride 10. The term "unloading station" as used herein is intended to denote an area where the rider 16 exits a ride vehicle 18. In certain embodiments, the loading/unloading stations 24 are located in different areas of the amusement park ride 10. In other embodiments, the loading/unloading stations 24 are located in the same area of the amusement park ride 10. The term "control point" as used herein is intended to denote a location where verification that the rider 16 is properly secured within the ride vehicle 18 takes place. The term "lock point" as used herein is intended to denote the point at which the remote release locking mechanism 14 of the restraint system 12 is locked and unable to be unlocked. A "lock point" may refer to a location (e.g., the remote release locking mechanism 14 is locked beyond a certain physical location), a time point (e.g., the remote release locking mechanism 14 is locked after a particular time), or an event point (e.g., the remote release locking mechanism 14 is locked before a particular event, such as a vehicle movement start). The term "unlock point" as used herein is intended to denote the point at which the remote release locking mechanism 14 of the restraint system 12 is unlocked.

As described in greater detail herein, the remote release locking mechanism 14 of the restraint system 12 may be activated at the locking point prior to passing through the control point. In certain embodiments, the locking point may include a gate 28 positioned at the loading/unloading station 24. In certain embodiments, the gate 28 may include a transmitter 30 that transmits a wireless signal 32 to the restraint system 12. The wireless signal 32 is configured to lock or unlock the remote release locking mechanism 14, as described in greater detail herein. In the illustrated embodiment, the gate 28 is positioned over the tracks 20. However, the gate 28 may be positioned at any other suitable location within the amusement park ride 10 that allows wireless communication between the restraint system 12 and the transmitter 30. In other embodiments, the crew member 26 may use a handheld device 34 to transmit the wireless signal 32 to the remote release locking mechanism 14, thereby locking the remote release locking mechanism 14 and securing the rider 16 within the ride vehicle 18.

As described in greater detail herein, the remote release locking mechanism 14 may not be unlocked without receiving a lock deactivation signal transmitted after completion of the amusement park ride 10. For example, the gate 28 or the handheld device 34 transmits the wireless signal 32 at the loading/unloading station 24 after completion of the amusement park ride 10 to deactivate the remote release locking mechanism 14 and release the rider 16 from the ride vehicle 18. In certain embodiments, the handheld device 34 may be used to override the activation signal from the gate 28, for example, when a rider 16 needs to unload from the ride vehicle 18 after passing through the lock point and before start of the amusement park ride 10.

In the illustrated embodiment, the restraint system 12 includes a lap belt 36 configured to be placed at least partially around a rider 16 of a ride vehicle 18 and to be locked/unlocked by the remote release locking mechanism 14 described herein to secure the rider 16 within the ride vehicle 18 (e.g., with respect to a ride seat 22 of the ride vehicle 18). However, in other embodiments, the restraint system 12 may include a 5-point harness, a restraint bar, or any other suitable restraining mechanism configured to be placed at least partially around a rider 16 of a ride vehicle 18 and to be locked/unlocked by the remote release locking mechanism 14 described herein to secure the rider 16 within the ride vehicle 18 (e.g., with respect to a ride seat 22 of the ride vehicle 18).

Figure 2:
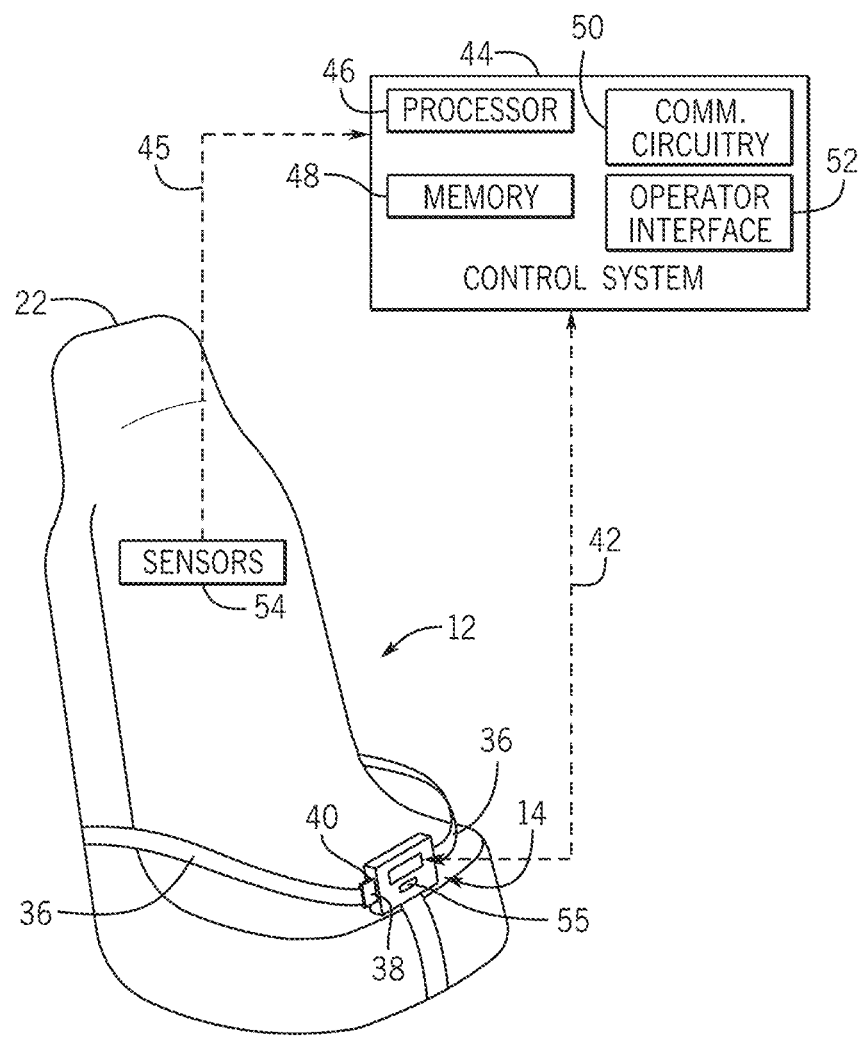
FIG. 2 illustrates the restraint system of FIG. 1 in which a lap belt is in a locked configuration, in accordance with embodiments of the present disclosure.

FIG. 2 illustrates the restraint system 12 of FIG. 1 in which the lap belt 36 is in a locked configuration. Once the lap belt 36 is properly positioned around the waist of the rider 16, the rider 16 may insert a male connector 38 of the lap belt 36 into a respective female connector 40 of the remote release locking mechanism 14 to removably couple the lap belt 36 to the remote release locking mechanism 14. Following coupling of the lap belt 36 to the remote release locking mechanism 14 (e.g., via the connectors 38, 40), the remote release locking mechanism 14 may be activated to secure the rider 16 within the ride vehicle 18.

As described in greater detail herein, the remote release locking mechanism 14 includes dual redundant latches (e.g., a primary latch and a secondary, redundant latch) that function to lock and unlock the remote release locking mechanism 14. For example, as illustrated in FIG. 2, the remote release locking mechanism 14 may receive an activation signal 42 from a control system 44 prior to the start of the amusement park ride 10 (e.g., before movement of the ride vehicle 18 along the tracks 20). The control system 44 may be part of a main control system of the amusement park ride 10 or a separate control system integrated into, for example, the gate 28. In certain embodiments, the control system 44 may detect that a rider 16 is occupying the ride seat 22 and, in response, transmit the activation signal 42 to the remote release locking mechanism 14. For example, once the control system 44 identifies that the rider 16 is occupying the ride seat 22, the control system 44 may transmit the activation signal 42 once the ride vehicle 18 approaches the lock point at the loading station 24. In other embodiments, the crew member 26 may actuate the remote release locking mechanism 14 using the handheld device 34.

The control system 44 may include at least one processor 46, which may include one or more processing devices, and at least one memory 48 storing instructions executable by the at least one processor 46. The at least one memory 48 may include one or more tangible, non-transitory, machine-readable media. By way of example, such machine-readable media can include RAM, ROM, EPROM, EEPROM, optical disk storage, magnetic disk storage or other magnetic storage devices, or any other medium which can be used to store desired program code in the form of machine-executable instructions or data structures, and which can be accessed by the at least one processor 46 or by any general purpose or special purpose computer or other machine with a processor. The control system 44 may also include communication circuitry 50 and/or input and output circuitry to facilitate communication with other components of the amusement park ride 10 (e.g., the remote release locking mechanism 14, the gate 28, the handheld device 34, and so forth) for the purpose of locking/unlocking the remote release locking mechanism 14, as described in greater detail herein. In addition, the control system 44 may be coupled, either directly or wirelessly, to an operator input device or operator interface 52 that, in operation, may be used by a ride technician to provide input used to control one or more ride features. The operator interface 52, or other components of the amusement park ride 10, may be located remotely from the control system 44 in certain embodiments and may be, for example, implemented on a mobile device.

The communication circuitry 50 of the control system 44 may transmit the activation signal 42 to the remote release locking mechanism 14. As described in greater detail herein, upon receiving the activation signal 42, dual redundant latches (e.g., a primary latch and a secondary, redundant latch) of the remote release locking mechanism 14 may be actuated by the control system 44, which secures and blocks movement of the respective male connector 38 out of the respective female connector 40. By blocking movement of the male connector 38, a rider 16 may be unable to prematurely unlock the remote release locking mechanism 14 while the ride vehicle 18 is in motion.

In certain embodiments, the ride seat 22 may include a sensor 54 that determines whether the restraint system 12 of each ride seat 22 is in the restrained or unrestrained configuration. For example, when the restraint system 12 is in the unrestrained configuration, the sensor 54 may transmit a signal 45 to the control system 44 indicating that the restraint system 12 is in the unrestrained configuration. The control system 44 may block release of the ride vehicle 18 from the lock point and or the control point until the restraint system 12 is in the restrained configuration. As such, the crew member 26 may need to verify that the ride seat 22 is vacant, manually couple the male connectors 38 to the female connectors 40, and activate the remote release locking mechanism 14 using the handheld device 34. The control system 44 may then determine that all restraint systems 12 in the ride vehicle 18 are secured and release the ride vehicle 18. In the illustrated embodiment, the sensor 54 is positioned on a back rest of the ride seat 22. However, the sensor 54 may be positioned at any other location on the ride seat 22 or the ride vehicle 18 that facilitates communication with the restraint system 12 and/or the control system 44.

In other embodiments, the sensor 54 may transmit a signal 45 indicative of an unoccupied ride seat 22. Upon detection of the signal 45 from the sensor 54, the control system 44 may determine that the ride seat 22 is unoccupied and allow release of the ride vehicle 18 from the control point with the restraint system 12 corresponding to the unoccupied ride seat 22 being in the unrestrained configuration. For example, in certain embodiments, the sensor 54 may receive a signal from retro-reflective markers positioned on the ride seat 22. The retro-reflective markers may reflect light that is detected by the sensor 54. Based on the intensity of the reflected light or the degree of attenuation of the reflected light detected by the sensor 54, the control system 44 may determine whether the ride seat 22 is occupied or unoccupied. For example, when a rider 16 is positioned within the ride seat 22, the rider 16 may block at least a portion of the retro-reflective markers. As such, the light reflected by the retro-reflective markers may be attenuated. However, when the ride seat 22 is unoccupied, the retro-reflective markers are not blocked and the intensity of the light reflected by the retro-reflective markers would be greater than the intensity of light reflected when the ride seat 22 is occupied. Accordingly, the control system 44 may determine that the ride seat 22 is unoccupied.

In other embodiments, the sensor 54 may be a pressure sensor disposed on the ride seat 22. For example, the sensor 54 may be disposed on a back rest or seat cushion of the ride seat 22. The pressure sensor may transmit a signal 45 to the control system 44 indicative of a pressure exerted on the ride seat 22. If the pressure signal is less than a predetermined value (e.g., less than approximately 5 pounds per square inch), the control system 44 may determine that the ride seat 22 is unoccupied. As such, the control system 44 may release the ride vehicle 18 from the control point with the restraint system 12 corresponding to the unoccupied ride seat 22 in the unrestrained configuration.

In addition, in certain embodiments, the remote release locking mechanism 14 may include one or more internal sensors 55 (e.g., contained within a lap belt latch cover 60 of the remote release locking mechanism 14) configured to detect whether one or more of the latches of the remote release locking mechanism 14 are in a latched (e.g., locked) position or an unlatched (e.g., released) position (e.g., detect a latching state). For example, in certain embodiments, the internal sensors 55 may include physical and/or electrical contact sensors, optical sensors, or other position detection sensors, which may be configured to detect whether the latches of the remote release locking mechanism 14 are in a latched (e.g., locked) position or an unlatched (e.g., released) position (e.g., detect a latching state), and to transmit one or more signals relating to the latching state(s) to the control system 44 such that the control system 44 can act on this information by, for example, transmitting activation and/or deactivation signals to the remote release locking mechanism 14, as described in greater detail herein.

After completion of the amusement park ride 10, the restraint system 12 may be unlocked. For example, once the amusement park ride 10 is complete and the ride vehicle 18 is at a complete stop in the unloading station 24, the control system 44 may transmit a deactivation signal 42 to the remote release locking mechanism 14. As described in greater detail herein, upon receiving the deactivation signal 42 from the control system 44, dual redundant latches (e.g., a primary latch and a secondary, redundant latch) of the remote release locking mechanism 14 may be released, thereby enabling movement of the respective male connector 38 out of the respective female connector 40. By enabling movement of the male connector 38, a rider 16 may be able to exit the ride vehicle 18.

In certain embodiments, the crew member 26 may deactivate the remote release locking mechanism 14 of the restraint system 12 using the handheld device 34. By deactivating the remote release locking mechanism 14 of the restraint system 12 via a wireless signal, premature unlocking of the remote release locking mechanism 14 may be avoided. Additionally, a power source used to actuate power-controlled restraint systems may not need to be integrated into the ride vehicle 18. Accordingly, existing amusement park rides that do not include a power source may be retrofit with the restraint system 12, thereby decreasing the cost associated with implementing a power source into the amusement park ride 10 and improving the restraint system 12 to better secure and retain a rider 16 within a ride seat 22 throughout the duration of the amusement park ride 10.

Accordingly, the remote release locking mechanism 14 of the restraint system 12 may be remotely actuated by the control system 44 to restrain a rider 16 within a ride seat 22 of an amusement park ride 10 and then to release the rider 16 from the ride seat 22 of the amusement park ride 10 once the ride has completed. In particular, as described in greater detail herein, the remote release locking mechanism 14 of the restraint system 12 includes dual redundant latches configured to provide redundant latching of the remote release locking mechanism 14, for example, in the event that one of two latches (e.g., a first, primary latch) of the dual redundant latches fail to actuate (and/or remain actuated). The dual nature of the dual redundant latches of the remote release locking mechanism 14 described herein ensures that at least one of two latches of the dual redundant latches (e.g., a second, redundant latch) will continue to provide latching functionality even if the other of the two latches of the dual redundant latches (e.g., a first, primary latch) does not. It will be appreciated that, while described primarily herein as including dual redundant latches having two latches (e.g., a first, primary latch and a second, redundant latch), in other embodiments, the remote release locking mechanism 14 may include any number of a plurality of latches (e.g., a first, primary latch and two redundant latches, a first, primary latch and three redundant latches, a first, primary latch and four redundant latches, and so forth).

Figure 3:
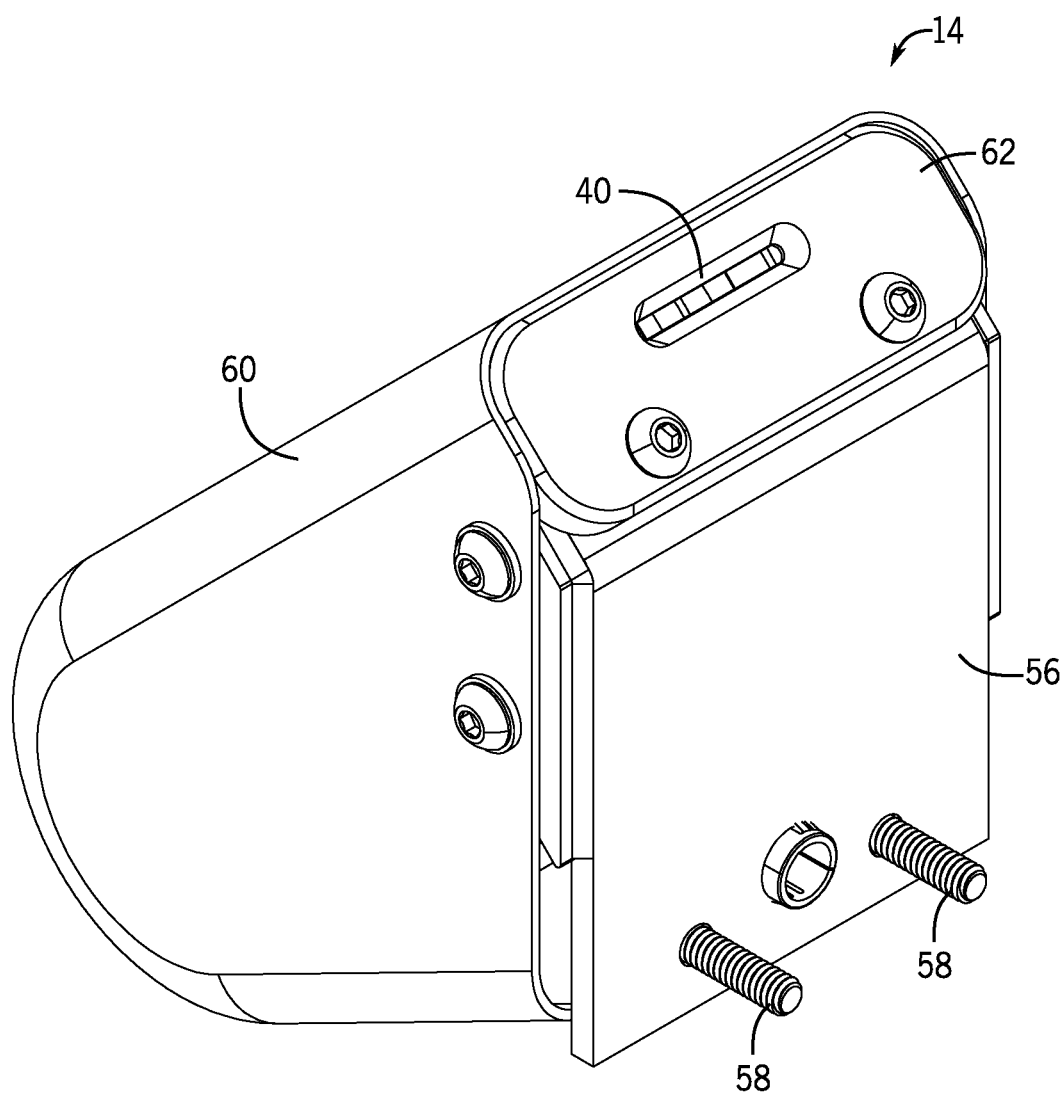
FIG. 3 is a perspective view of the remote release locking mechanism of the restraint system of FIGS. 1 and 2, in accordance with embodiments of the present disclosure.
Figure 4:
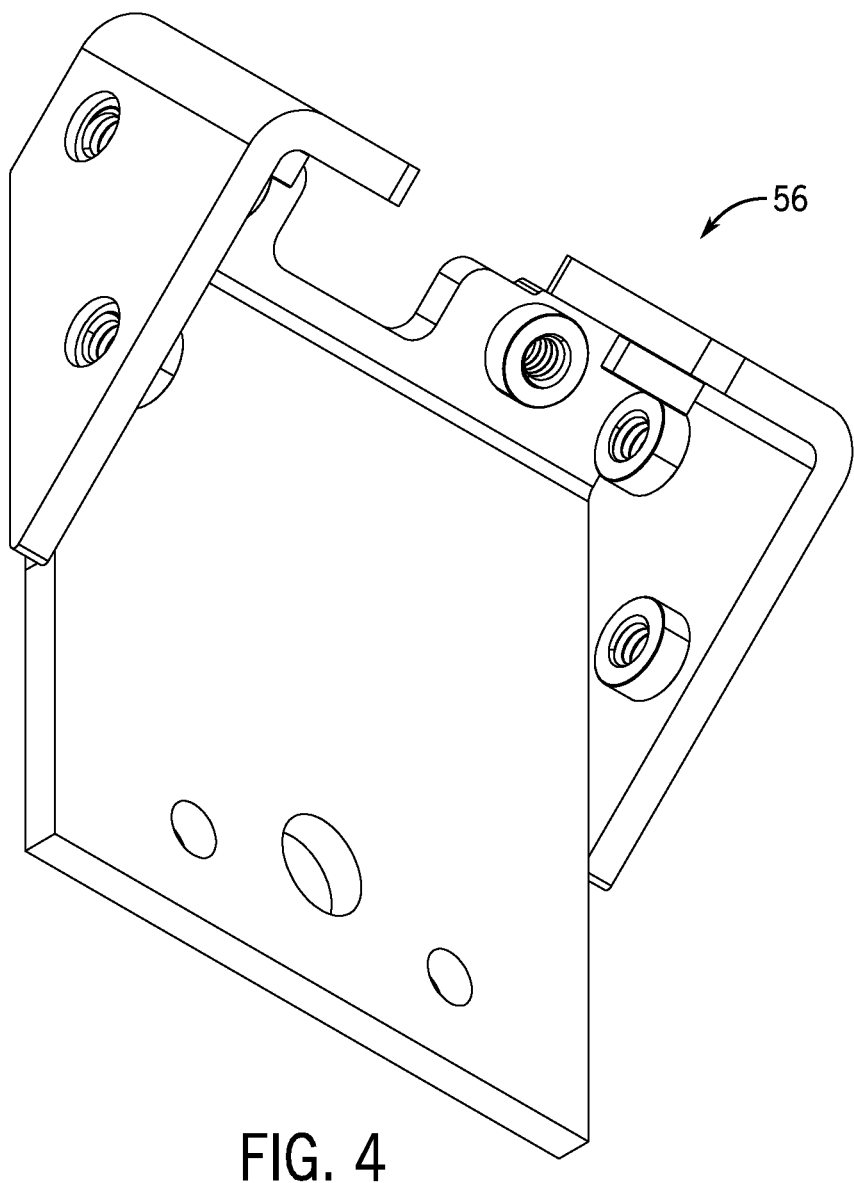
FIG. 4 is a perspective view of a lap belt bracket assembly of the remote release locking mechanism of FIG. 3, in accordance with embodiments of the present disclosure.
Figure 5:
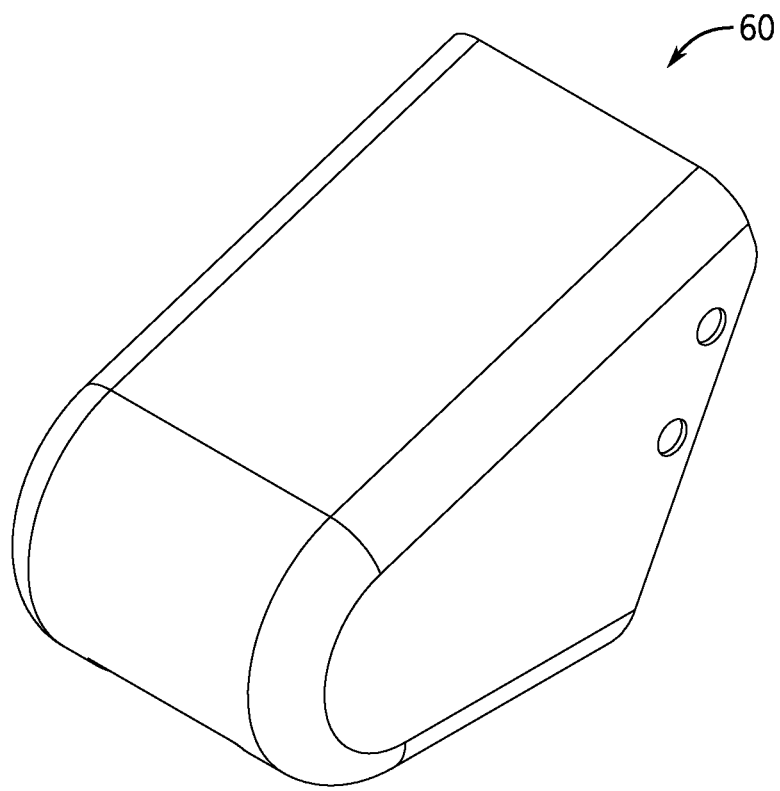
FIG. 5 is a perspective view of a lap belt latch cover of the remote release locking mechanism of FIG. 3, in accordance with embodiments of the present disclosure.
Figure 6:
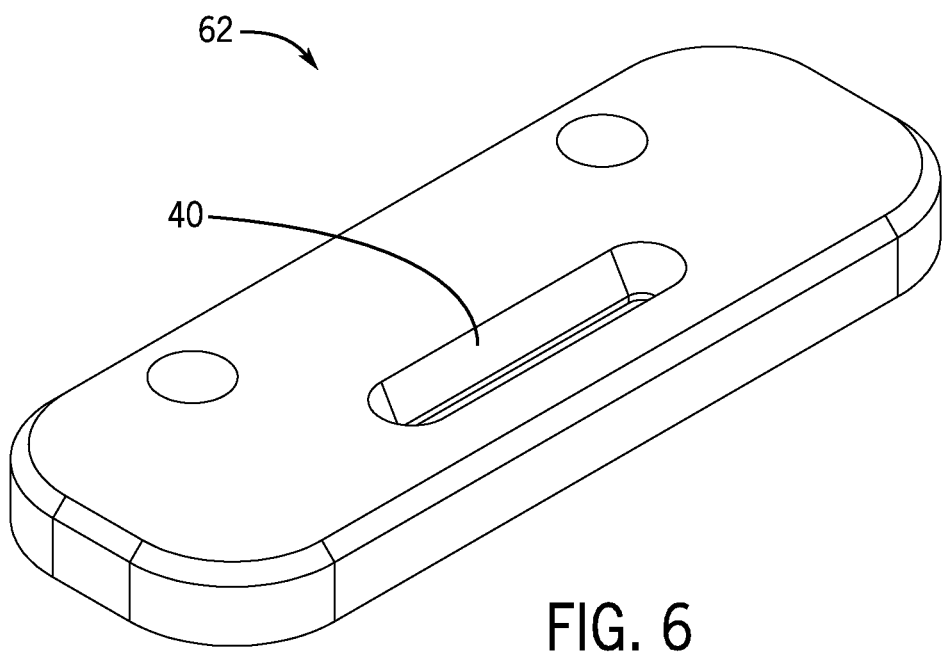
FIG. 6 is a perspective view of a lap belt receiver block of the remote release locking mechanism of FIG. 3, in accordance with embodiments of the present disclosure.

FIG. 3 is a perspective view of the remote release locking mechanism 14 of the restraint system 12 of FIGS. 1 and 2. As illustrated in FIG. 3, the remote release locking mechanism 14 includes a lap belt bracket assembly 56 (also illustrated in FIG. 4) to which certain components of a dual redundant latch assembly 64 may be mounted, as described in greater detail herein. As also illustrated in FIG. 3, the lap belt bracket assembly 56 may include one or more mounting features 58 configured to mount the remote release locking mechanism 14 to another mating mounting feature of a ride vehicle 18. In addition, as also illustrated in FIG. 3, the remote release locking mechanism 14 includes a lap belt latch cover 60 (also illustrated in FIG. 5) that encloses the components of the dual redundant latch assembly 64, as described in greater detail herein. In addition, as also illustrated in FIG. 3, the remote release locking mechanism 14 includes a lap belt receiver block 62 (also illustrated in FIG. 6) that is configured to receive a male connector 38 of a lap belt 36 of a ride vehicle 18. In particular, as illustrated in FIG. 3, the lap belt receiver block 62 includes a female connector 40 (e.g., a slot) into which the male connector 38 of the lap belt 36 may be inserted. As will be appreciated, the male connector 38 of the lap belt 36 may be formed as a tongue that includes an opening therethrough, which may be engaged by the dual redundant latch assembly 64, as described in greater detail herein.

Figure 7:
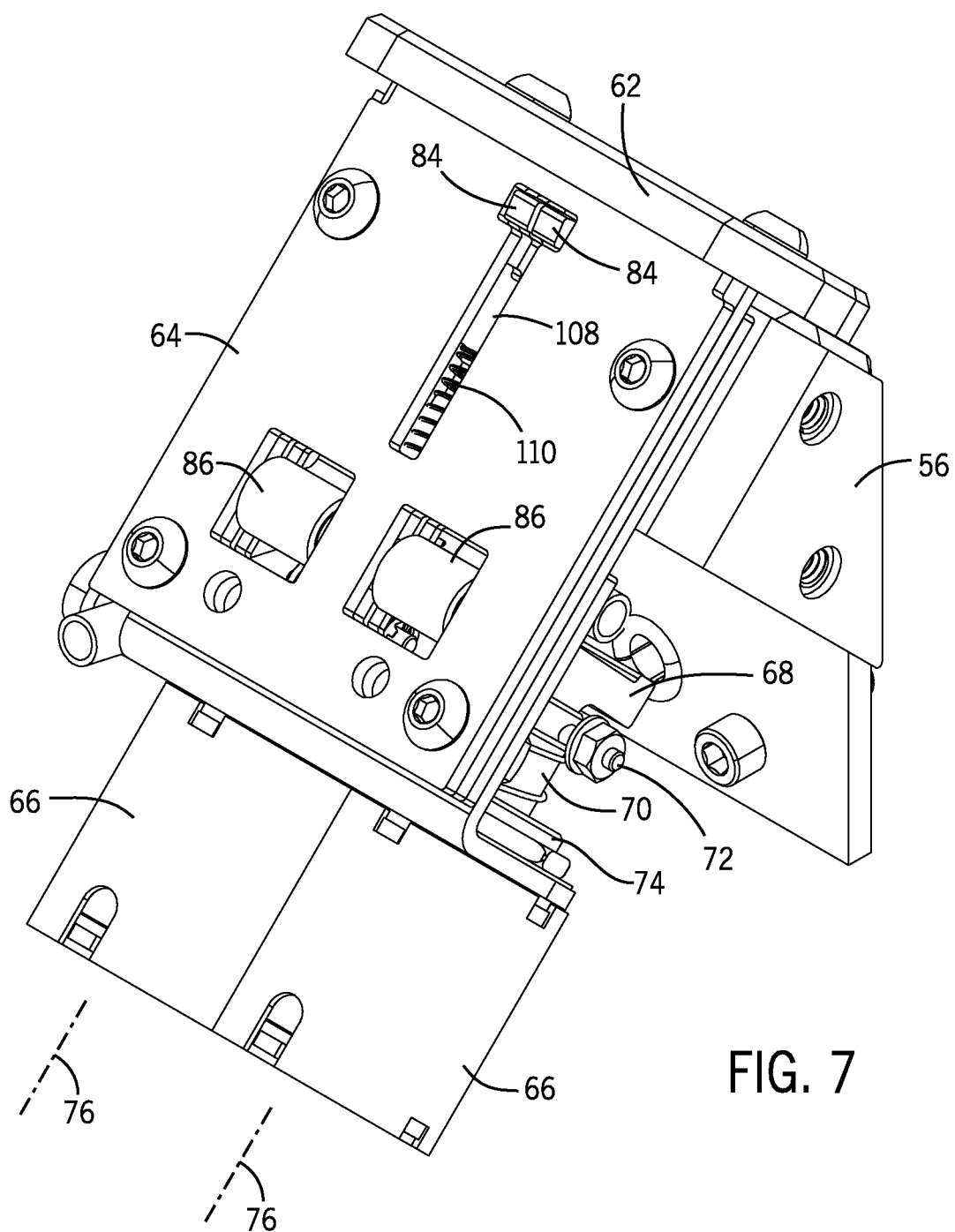
FIG. 7 is a perspective view of a dual redundant latch assembly, the lap belt bracket assembly, and the lap belt receiver block of the remote release locking mechanism of FIG. 3 assembled together, in accordance with embodiments of the present disclosure.
Figure 8:
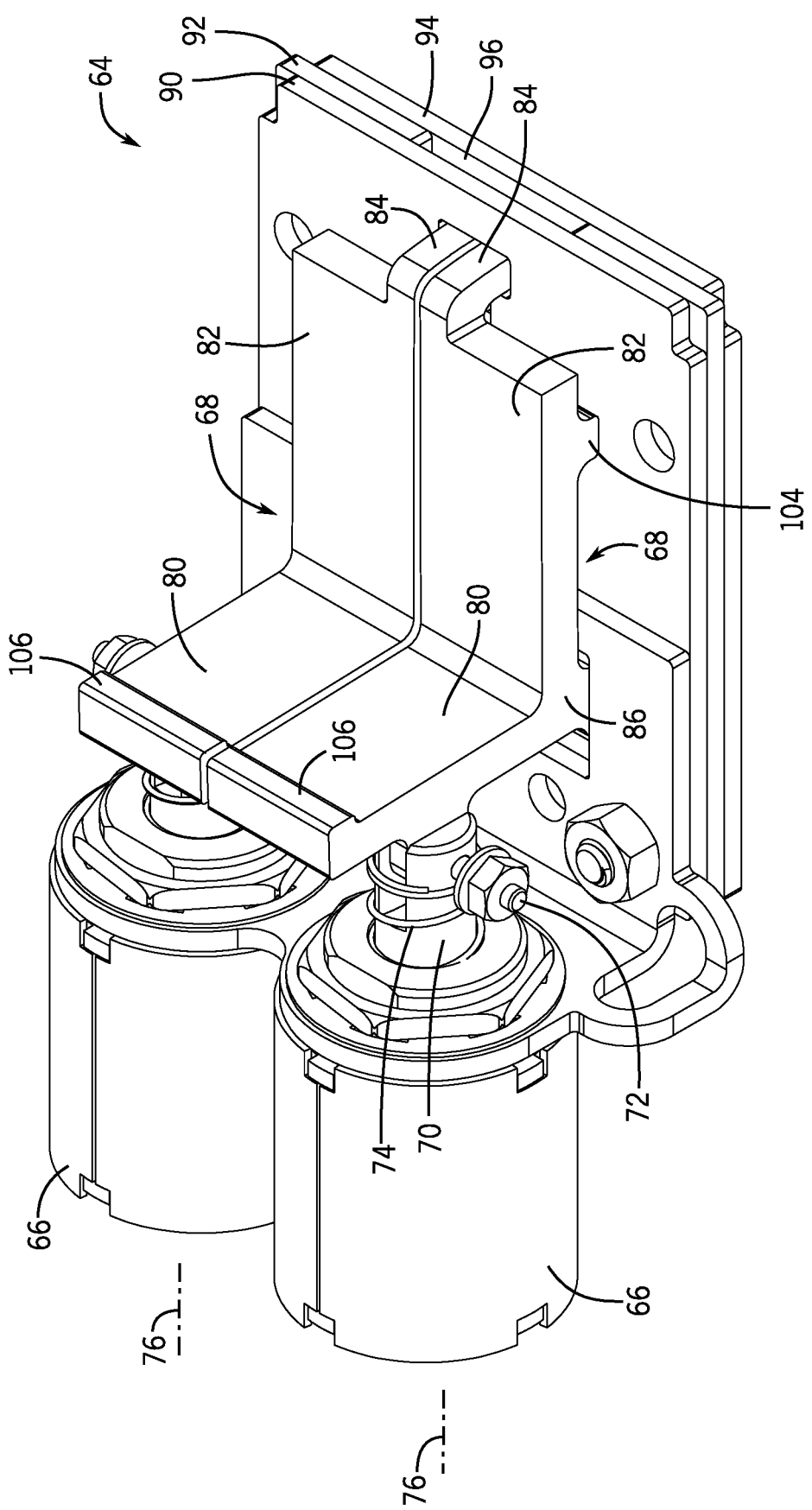
FIG. 8 is a perspective view of the dual redundant latch assembly of FIG. 7, in accordance with embodiments of the present disclosure.
Figure 9:
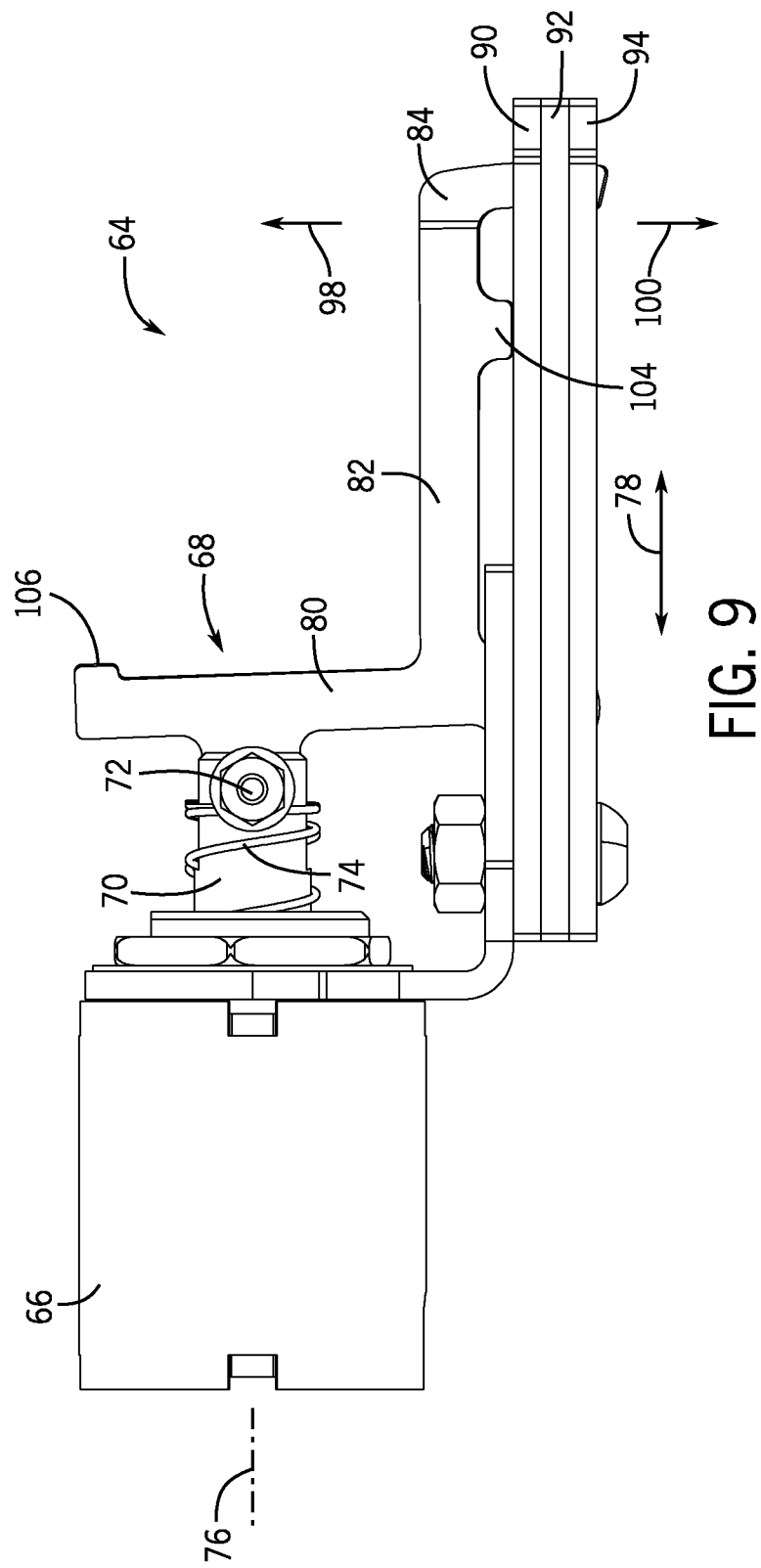
FIG. 9 is a side view of the dual redundant latch assembly of FIG. 7, in accordance with embodiments of the present disclosure.
Figure 10:
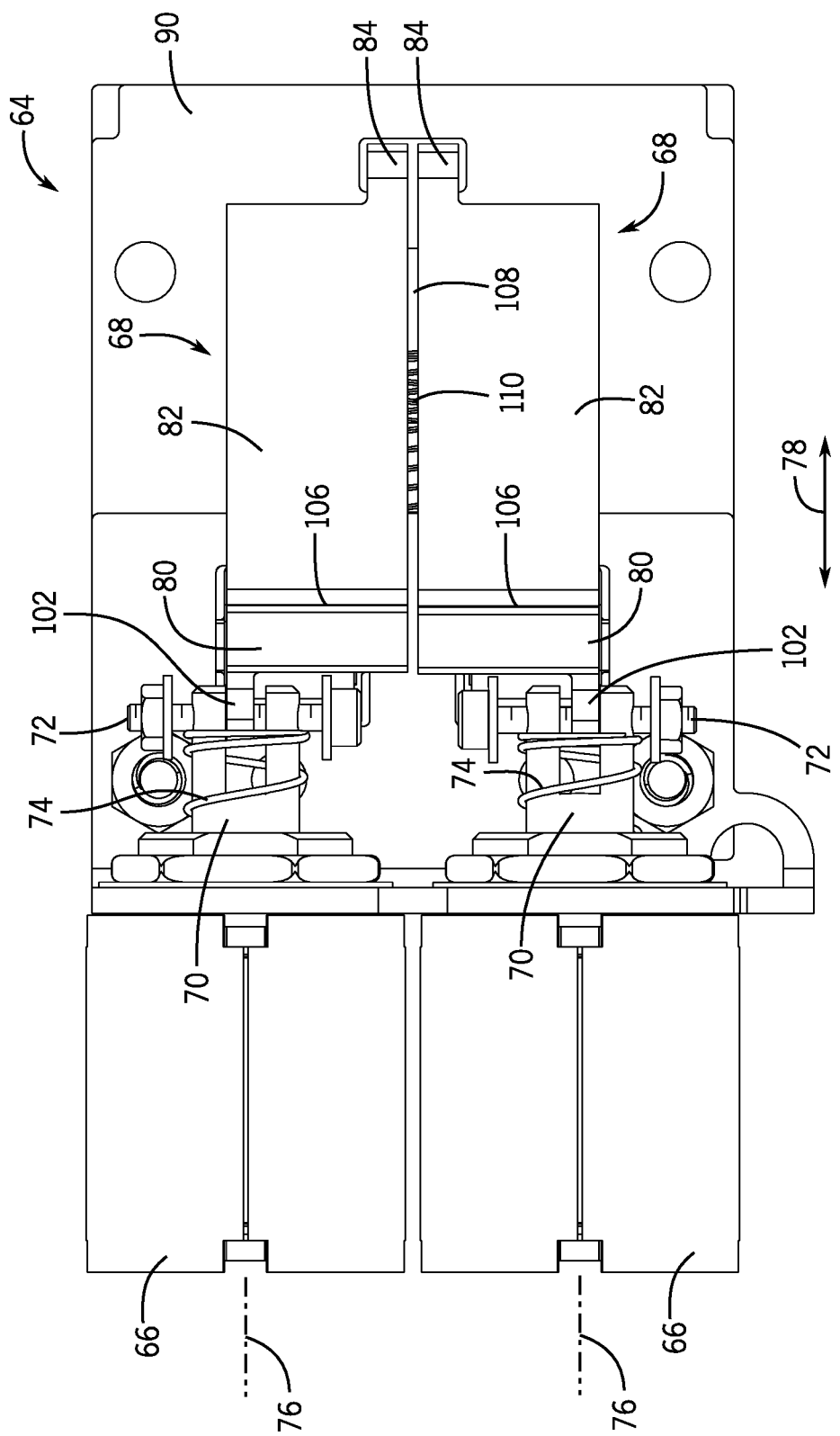
FIG. 10 is a top view of the dual redundant latch assembly of FIG. 7, in accordance with embodiments of the present disclosure.
Figure 11:
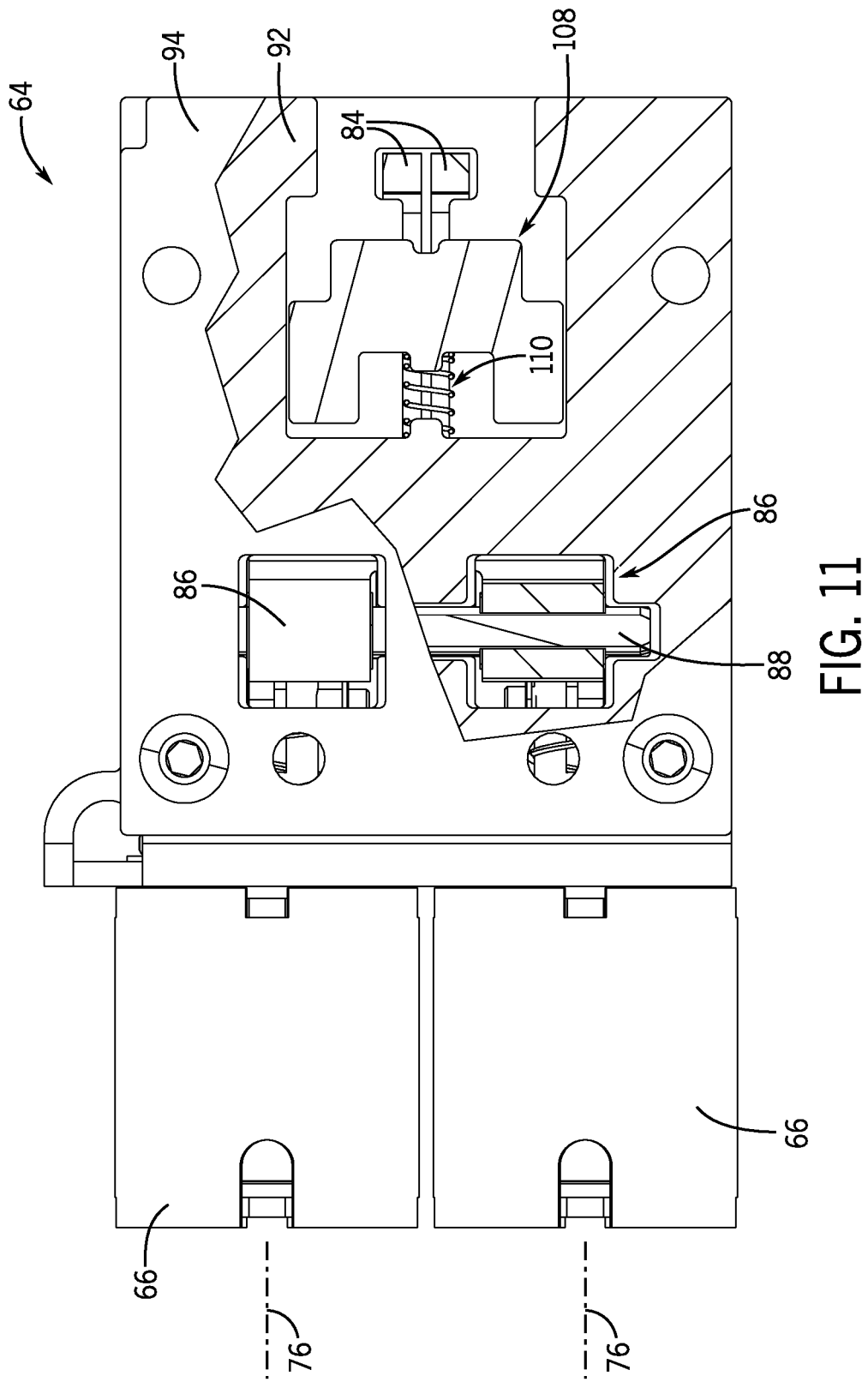
FIG. 11 is a cutaway bottom view of the dual redundant latch assembly of FIG. 7, in accordance with embodiments of the present disclosure.

FIGS. 7 through 11 illustrate various views of a dual redundant latch assembly 64 of the remote release locking mechanism 14 of the restraint system 12. In particular, FIG. 7 is a perspective view of the dual redundant latch assembly 64, the lap belt bracket assembly 56, and the lap belt receiver block 62 of the remote release locking mechanism 14 of the restraint system 12 assembled together, FIG. 8 is a perspective view of the dual redundant latch assembly 64, FIGS. 9 and 10 are side and top views, respectively, of the dual redundant latch assembly 64, and FIG. 11 is a cutaway bottom view of the dual redundant latch assembly 64. As illustrated most clearly in FIGS. 8 through 10, the dual redundant latch assembly 64 includes two (e.g., dual redundant) solenoids 66 disposed in parallel with each other, wherein each solenoid 66 is coupled to a respective toggle bolt 68. In particular, in certain embodiments, an armature 70 of each solenoid 66 is coupled to a respective toggle bolt 68 via a respective bolt 72. In addition, in certain embodiments, each armature 70 may be radially surrounded by a respective solenoid spring 74 that helps balance forces between the respective solenoid 66 and toggle bolt 68 when the respective solenoid 66 is energized/deenergized, as described in greater detail herein.

The toggle bolts 68 described herein are shaped for relatively efficient machining from a billet for low quantity manufacturing. However, in higher quantities, the shape of the toggle bolt 68 may change for efficient production in a chosen manufacturing method, such as investment casting, sintered metal, injection molding, die casting, and so forth.

In certain embodiments, the solenoids 66 may be direct current (DC) activated pull-type tubular solenoids. However, in other embodiments, other types of solenoids, such as push-type tubular solenoids, may be used instead. Regardless, when energized by respective electrical currents (e.g., as provided by the control system 44 described herein), the respective armatures 70 of the respective solenoids 66 are moved to a first axial position in a first axial direction along an axis 76 of the respective solenoids 66, and when the respective electrical currents are removed (i.e., the respective solenoids 66 are deenergized), the respective armatures 70 of the respective solenoids 66 are moved to a second axial position in a second axial direction (e.g., opposite the first axial direction) along the axis 76 of the respective solenoids 66, as illustrated by arrow 78 in FIGS. 9 and 10.

As illustrated most clearly in FIGS. 8 and 9, in certain embodiments, each of the toggle bolts 68 are generally l-shaped with a first leg 80 of the l-shaped toggle bolts 68 coupled to an armature 70 of a respective solenoid 66, and a second leg 82 of the l-shaped toggle bolts 68 having a latch 84 (e.g., a toggle tooth) disposed at an end of the second leg 82 opposite the first leg 80. As described in greater detail herein, movement of the armatures 70 of respective solenoids 66 to a first axial position toward (e.g., into) the respective solenoids 66 (e.g., when the respective solenoids 66 are energized) applies a first axial force on the first legs 80 of respective l-shaped toggle bolts 68 to move the first legs 80 toward the respective solenoids 66, and movement of the armatures 70 of respective solenoids 66 to a second axial position away from (e.g., out of) the respective solenoids 66 (e.g., when the respective solenoids 66 are deenergized) applies a second axial force on the first legs 80 of respective l-shaped toggle bolts 68 to move the first legs 80 away from the respective solenoids 66.

Figure 15:
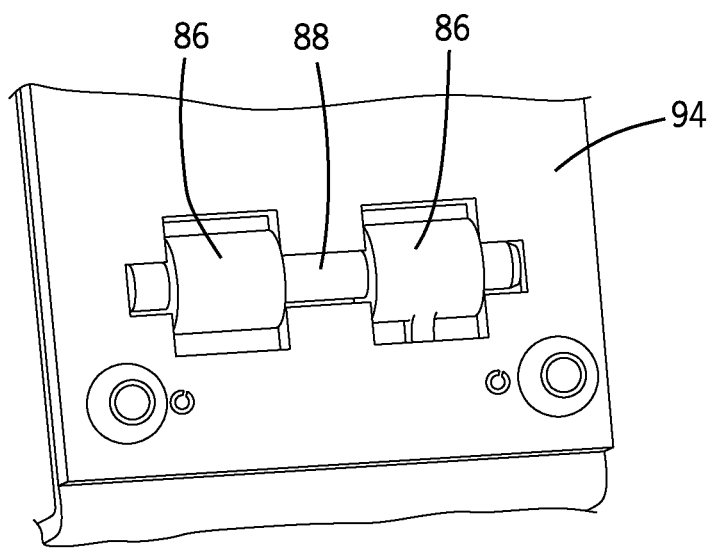
FIG. 15 is a perspective bottom view of the dual redundant latch assembly of FIG. 7, in accordance with embodiments of the present disclosure.

As illustrated most clearly in FIGS. 7, 8, 11, and 15, each toggle bolt 68 includes a pivot extension 86 from a corner of the l-shaped toggle bolt 68 where the first leg 80 and the second leg 82 of the l-shaped toggle bolt 68 meet. As illustrated in FIGS. 11 and 15, in certain embodiments, a pivot pin 88 extends through each of the pivot extensions 86 of the l-shaped toggle bolts 68 such that the l-shaped toggle bolts 68 pivot about the pivot pin 88. As such, movement of the armatures 70 of respective solenoids 66 to the first axial position toward (e.g., into) the respective solenoids 66 (e.g., when the respective solenoids 66 are energized) applies the first axial force on the first legs 80 of the respective l-shaped toggle bolts 68 to move the first legs 80 toward the respective solenoids 66, which causes the respective l-shaped toggle bolts 68 to pivot about the pivot pin 88 such that the second legs 82 of the respective l-shaped toggle bolts 68 move away from mounting plates 90, 92, 94 of the dual redundant latch assembly 64, thereby moving the respective latches 84 out of a latching channel 96 (e.g., a latch slot) formed between the mounting plates 90, 92, 94 (see FIG. 8), as illustrated by arrow 98 in FIG. 9. Conversely, movement of the armatures 70 of respective solenoids 66 to the second axial position away from (e.g., out of) the respective solenoids 66 (e.g., when the respective solenoids 66 are deenergized) applies the second axial force on the first legs 80 of respective l-shaped toggle bolts 68 to move the first legs 80 away from the respective solenoids 66, which causes the respective l-shaped toggle bolts 68 to pivot about the pivot pin 88 such that the second legs 82 of the respective l-shaped toggle bolts 68 move toward the mounting plates 90, 92, 94 of the dual redundant latch assembly 64, thereby moving the respective latches 84 into the latching channel 96 formed between the mounting plates 90, 92, 94, as illustrated by arrow 100 in FIG. 9.

Figure 12:
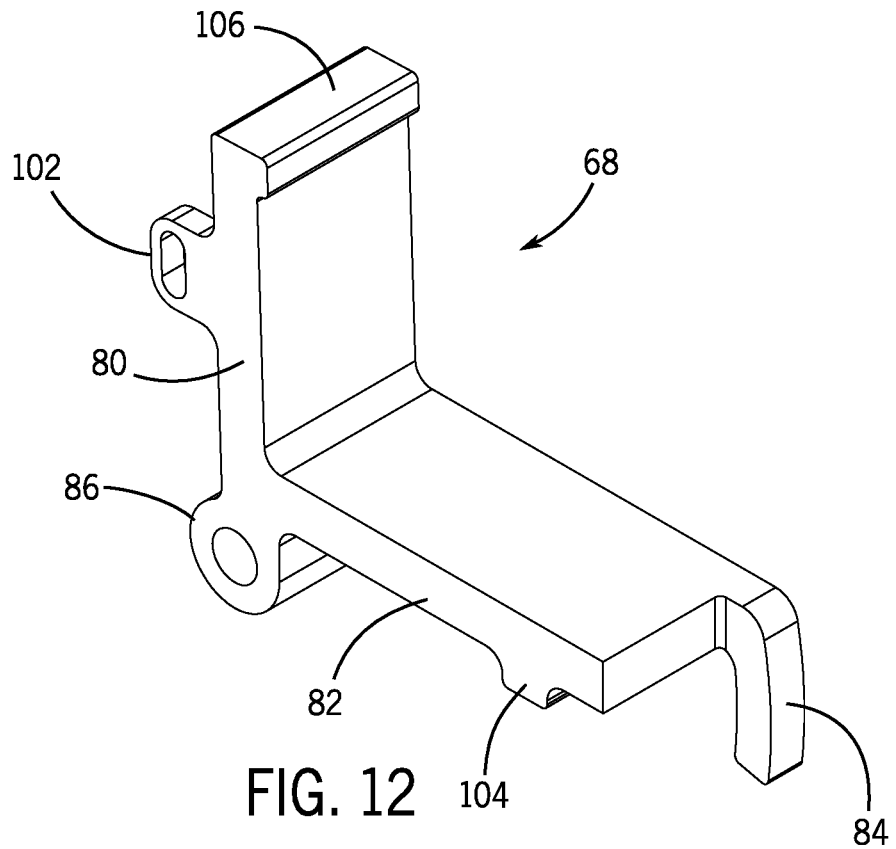
FIG. 12 is a perspective view of a toggle bolt of the dual redundant latch assembly of FIG. 7, in accordance with embodiments of the present disclosure.
Figure 13:
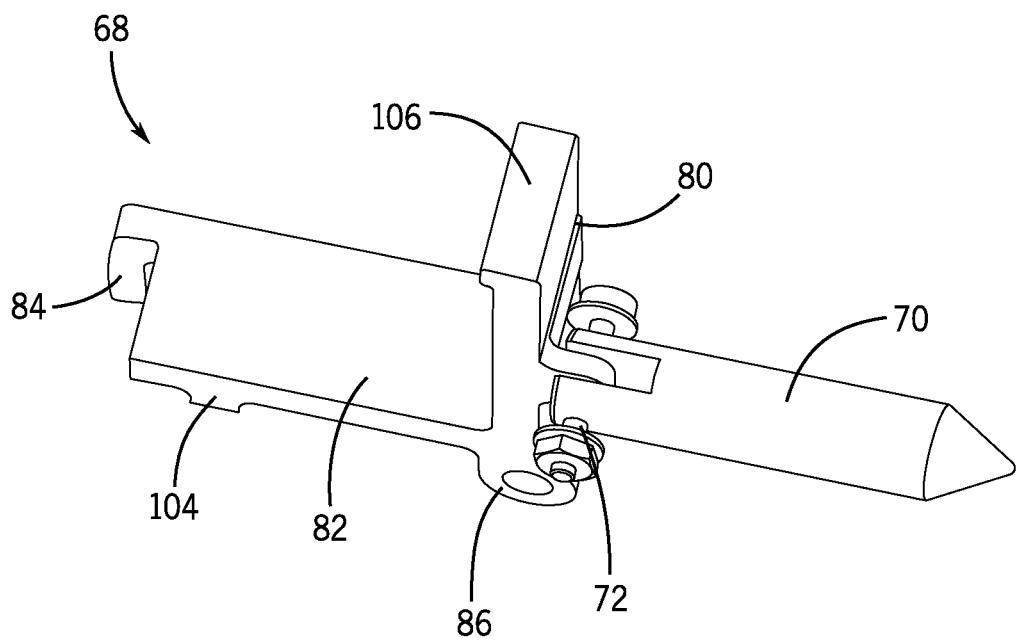
FIG. 13 is a perspective view of a toggle bolt coupled to an armature of a solenoid of the dual redundant latch assembly of FIG. 7, in accordance with embodiments of the present disclosure.

FIG. 12 is a perspective view of a toggle bolt 68 of the dual redundant latch assembly 64 of FIG. 8. As illustrated, in certain embodiments, each toggle bolt 68 may include a slot 102 that extends from the first leg 80 of the toggle bolt 68 and that is configured to receive a bolt 72 that couples an armature 70 of a respective solenoid 66 to the toggle bolt 68 (see FIG. 13). As illustrated in FIG. 12, in certain embodiments, the slot 102 of the toggle bolt 68 may be shaped to accommodate radius changes as the toggle bolt 68 pivots about its respective pivot extension 86. As also illustrated in FIG. 12, in certain embodiments, each toggle bolt 68 may include a stop 104 (e.g., an extension) that extends from the second leg 82 of the toggle bolt 68 and that is used to control how far the respective latch 84 travels toward the mounting plates 90, 92, 94 by, for example, abutting against the first mounting plate 90 (see FIG. 9). As also illustrated in FIG. 12, in certain embodiments, each toggle bolt 68 may include a manual release projection 106, which may be manually engaged to release the latches 84, as described in greater detail herein.

Figure 17:
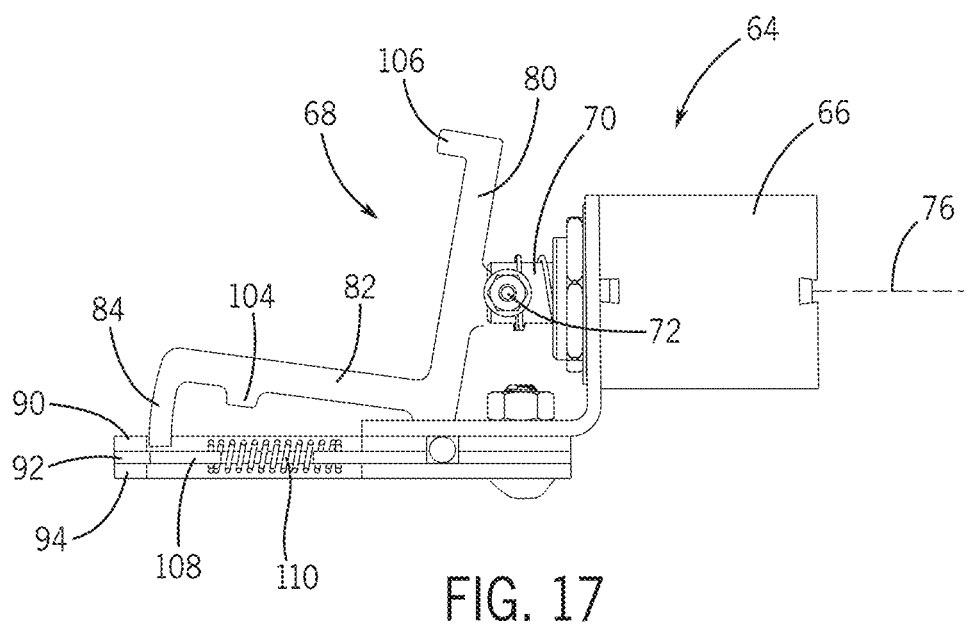
FIG. 17 is a cutaway side view of the dual redundant latch assembly of FIG. 7, in accordance with embodiments of the present disclosure.

In addition, as illustrated most clearly in FIGS. 11 and 17, in certain embodiments, the remote release locking mechanism 14 includes an ejector 108 and an ejector spring 110, for example, disposed within the latching channel 96 formed between the mounting plates 90, 92, 94, which may collectively function as an ejector mechanism to provide a force against the male connector 38 of the lap belt 36 when the male connector 38 is disposed within the latching channel 96 of the remote release locking mechanism 14. Specifically, the force of the ejector spring 110 against the ejector 108 will tend to push the male connector 38 out of the latching channel 96 with only the latches 84 holding the male connector 38 in the latching channel 96 when the latches 84 are in a locked position (e.g., being disposed within the opening 112 through the male connector 38). In certain embodiments, the ejector 108 may be manually activated (e.g., by a crew member 26) to move the latches 84 out of the opening 112 through the male connector 38 to unlatch the male connector 38 from the remote release locking mechanism 14.

Figure 14:
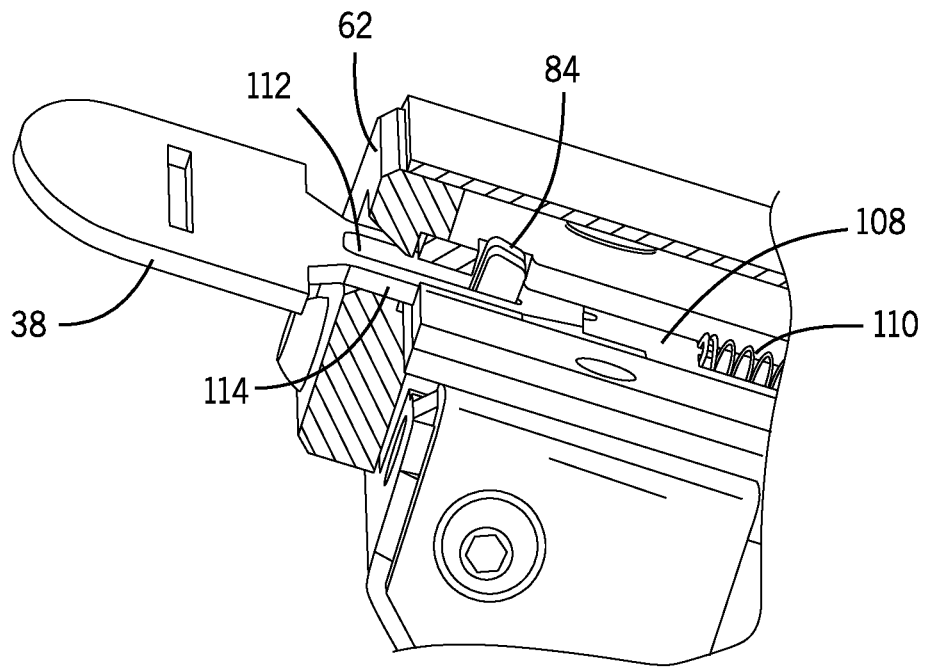
FIG. 14 illustrates a male connector of a lap belt that may be inserted into a latching channel of the dual redundant latch assembly of FIG. 7, in accordance with embodiments of the present disclosure.

As illustrated in FIG. 14, when a male connector 38 (e.g., tongue) of a lap belt 36 is inserted through the female connector 40 of the lap belt receiver block 62 of the remote release locking mechanism 14 (see FIG. 3), the male connector 38 may also be inserted into the latching channel 96 formed between the mounting plates 90, 92, 94 to act against a spring force provided by the ejector spring 110 by pushing against the ejector 108, where both of the latches 84 may engage (e.g., be inserted into) or disengage (e.g., be removed from) an opening 112 through the male connector 38 to latch or unlatch the male connector 38 within the remote release locking mechanism 14, as described in greater detail herein. In particular, when the ejector 108 is depressed by a particular distance, the latches 84 (which are both spring-loaded by respective solenoid springs 74 and both of which are resting against the ejector 108) are allowed to drop through the opening 112 through the male connector 38. The latches 84 being positioned within the opening 112 through the male connector 38 holds the male connector 38 in place relative to the remote release locking mechanism 14, acting against a force created by the ejector spring 110 against the ejector 108, which would otherwise tend to push the male connector 38 out of the latching channel 96.

Figure 16:
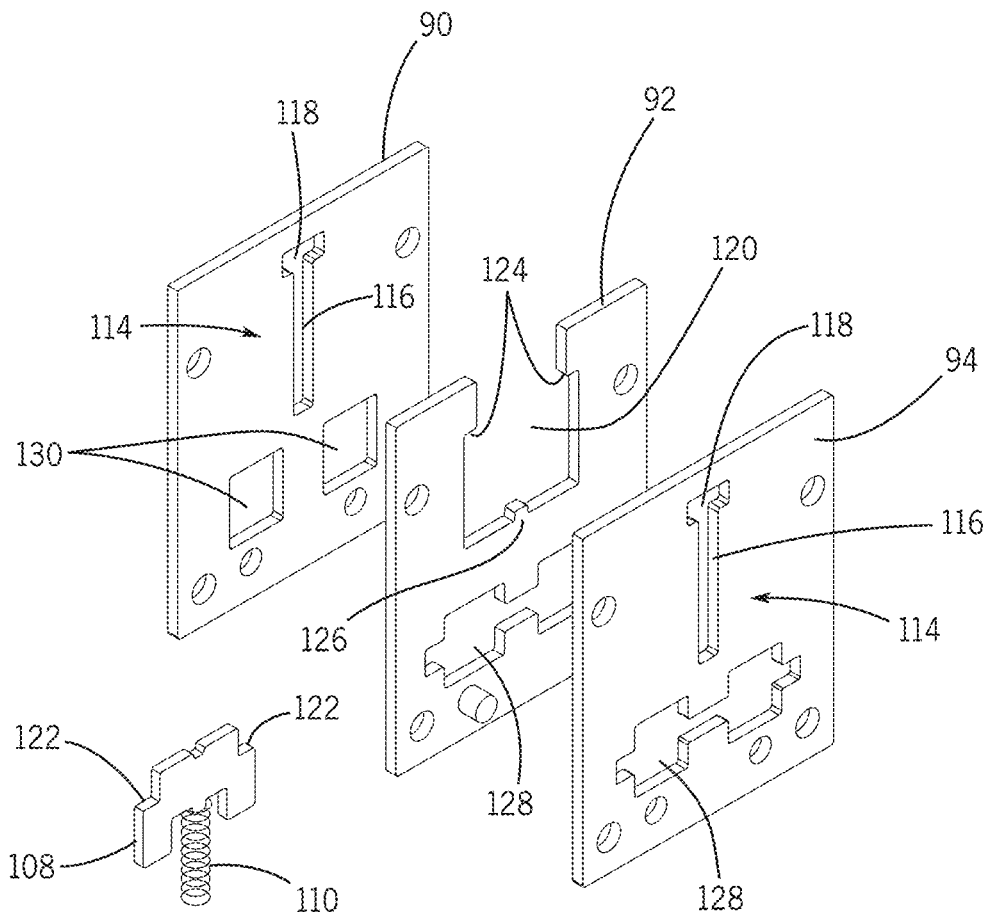
FIG. 16 is a perspective view of the mounting plates of the dual redundant latch assembly of FIG. 7, in accordance with embodiments of the present disclosure.

FIG. 16 is a perspective view of the mounting plates 90, 92, 94 of the dual redundant latch assembly 64, at least partially illustrating how the mounting plates 90, 92, 94 facilitate the functionality of the ejector 108 and ejector spring 110 (as well as the pivot extensions 86 of the toggle bolts 68 and the associated pivot pin 88). In particular, in certain embodiments, the first and third mounting plates 90, 94 (e.g., outer mounting plates) may each include a t-shaped slot 114 that includes a main slot portion 116 within which the ejector spring 110 may be at least partially disposed and through which the ejector spring 110 may move, and a secondary slot portion 118 within which the latches 84 may be disposed when the latches 84 are in a locked position, as described in greater detail herein. In addition, in certain embodiments, the second mounting plate 92 (e.g., an inner mounting plate) may include an open portion 120 (e.g., which forms the latching channel 96) within which both the ejector 108 and the ejector spring 110 may be disposed. As illustrated in FIG. 16, in certain embodiments, the ejector 108 may include first surfaces 122 configured to abut mating second surfaces 124 of the second mounting plate 92 to ensure that the ejector 108 remains in place within the latching channel 96 formed by the open portion 120 of the second mounting plate 92. In addition, in certain embodiments, an extension 126 (e.g., protrusion) extending from the second mounting plate 92 may be used to help align the ejector spring 110 within the latching channel 96 formed by the open portion 120 of the second mounting plate 92. In addition, in certain embodiments, the second and third mounting plates 92, 94 may each include openings 128 configured to hold the pivot extensions 86 of the toggle bolts 68 and the associated pivot pin 88 in place, whereas the first mounting plate 90 may include a pair of openings 130 configured to hold only the pivot extensions 86 of the toggle bolts 68 in place.

Figure 18A:
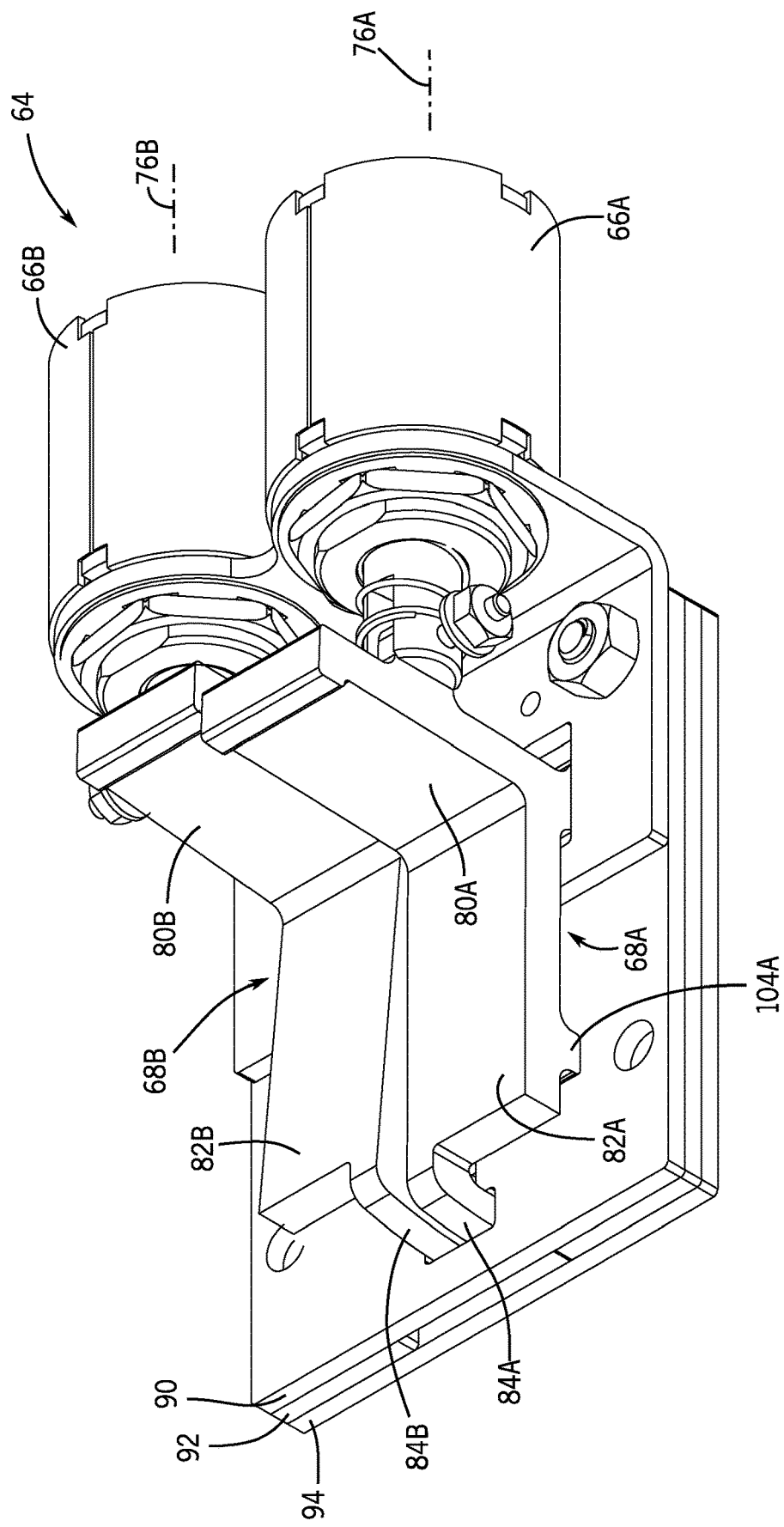
FIGS. 18A and 18B are a perspective view and a side view, respectively, of the dual redundant latch assembly of FIG. 7 where one of the latches is in a locked (e.g., latched) position and the other of the latches is in an unlocked (e.g., unlatched) position, in accordance with embodiments of the present disclosure.
Figure 18B:
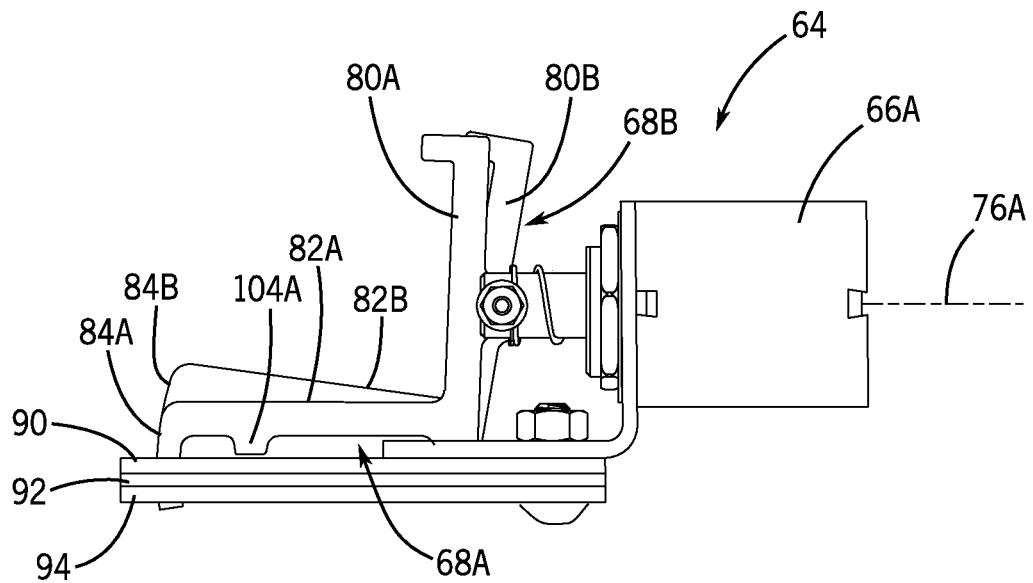

FIGS. 18A and 18B are a perspective view and a side view, respectively, of the dual redundant latch assembly 64 where one of the latches 84 (e.g., latch 84A) is in a locked (e.g., latched) position whereby the latch 84A holds the male connector 38 in place within the latching channel 96 of the remote release locking mechanism 14 (see, e.g., FIG. 14), and the other of the latches 84 (e.g., latch 84B) is in an unlocked (e.g., unlatched) position whereby the latch 84B releases the male connector 38 from the latching channel 96 of the remote release locking mechanism 14. As described in greater detail herein, the latches 84 may be individually controlled through actuation of respective solenoids 66 to provide redundancy between the latches 84. In particular, to hold the male connector 38 in place within the latching channel 96 of the remote release locking mechanism 14, only one of the latches 84 need to be in the locked (e.g., latched) position, for example, as illustrated in FIGS. 18A and 18B, whereas both of the latches 84 need to be in the unlocked (e.g., unlatched) position to release the male connector 38 from the latching channel 96 of the remote release locking mechanism 14, thereby allowing the ejector 108 and ejector spring 110 to eject the male connector 38 from the latching channel 96 of the remote release locking mechanism 14.

Figure 19:
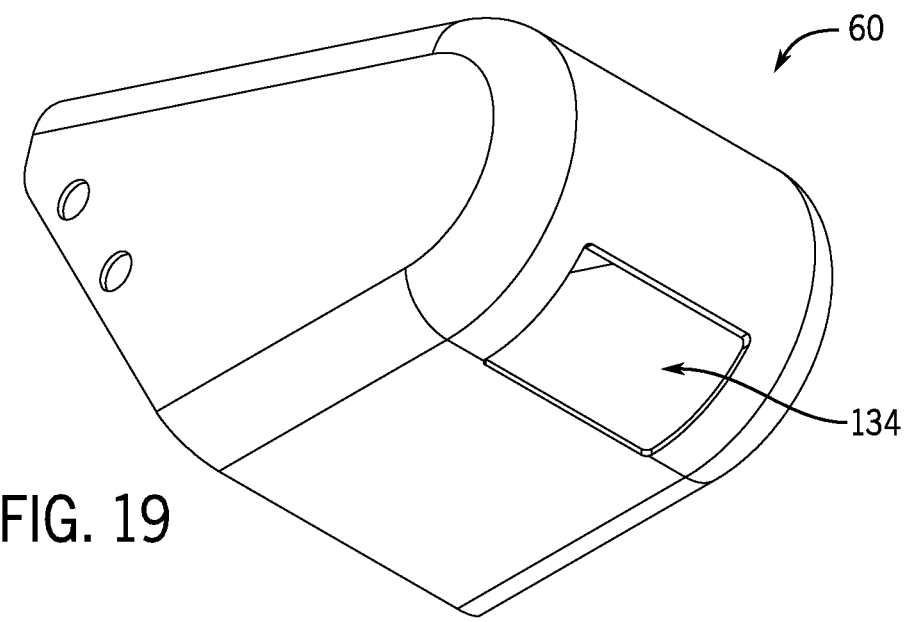
FIG. 19 is a perspective view of the lap belt latch cover of FIG. 5, in accordance with embodiments of the present disclosure.
Figure 20:
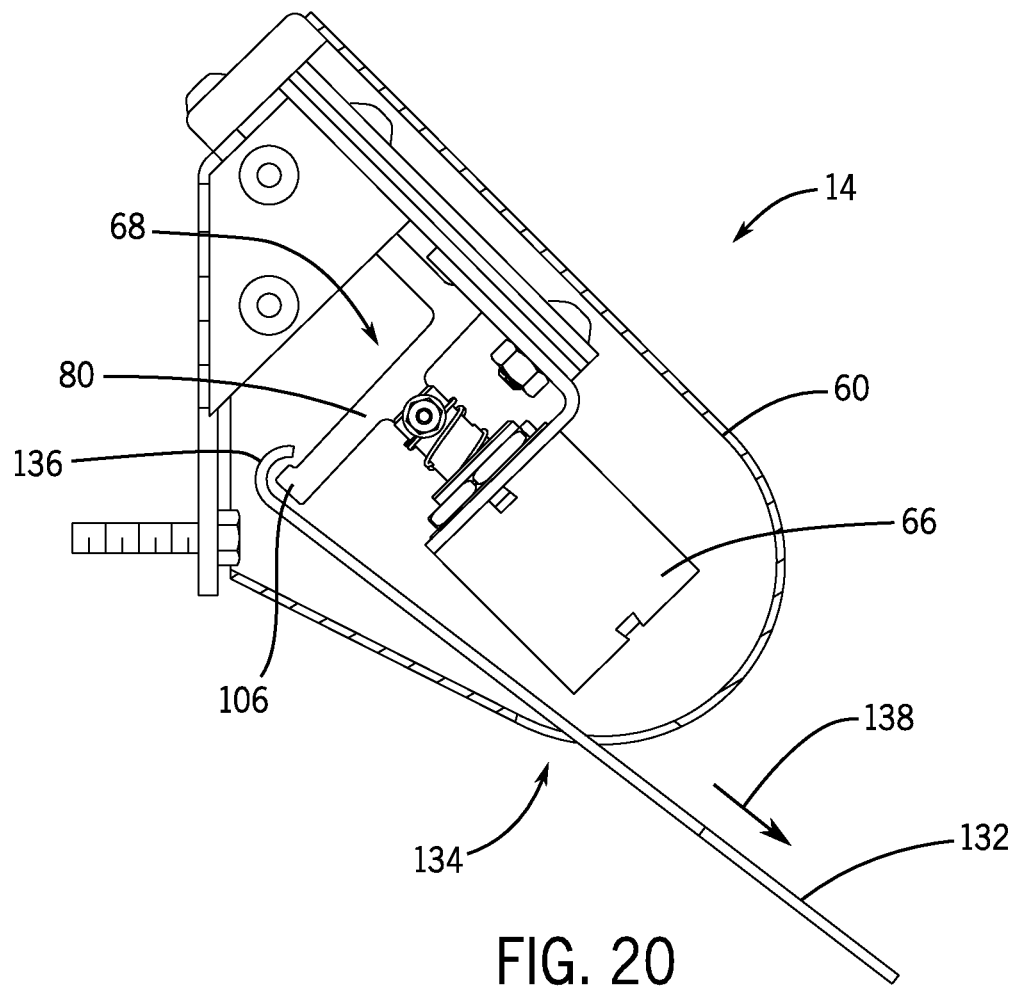
FIG. 20 is a cutaway side view of the remote release locking mechanism of FIG. 3 illustrating use of a manual ejector tool, in accordance with embodiments of the present disclosure.
Figure 21:
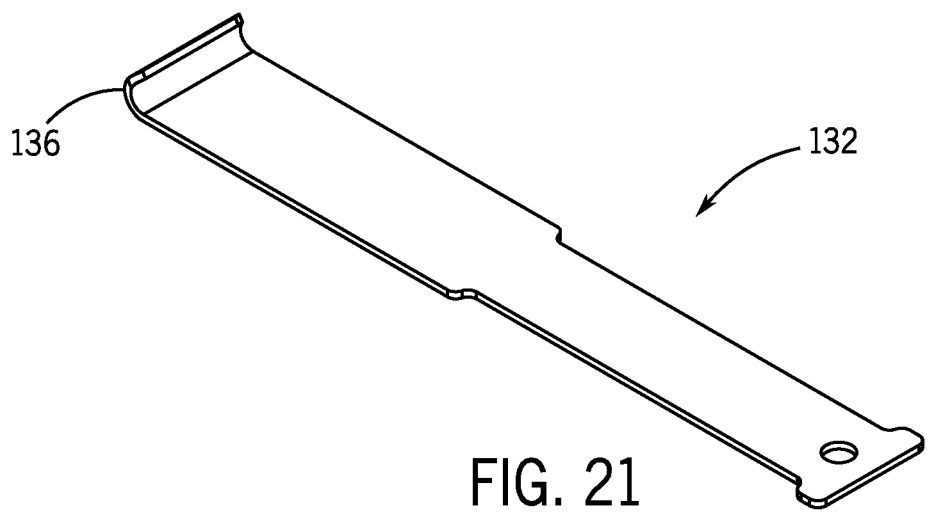
FIG. 21 is a perspective view of the manual ejector tool used in FIG. 20, in accordance with embodiments of the present disclosure.

In certain embodiments, a crew member 26 may insert a manual ejector tool 132 (see FIG. 21) into an opening 134 (see FIG. 19) through the lap belt latch cover 60 to manually move the latches 84 out of the opening 112 through the male connector 38 to unlatch the male connector 38 from the remote release locking mechanism 14. As illustrated in FIG. 20, the manual ejector tool 132 may be inserted into the remote release locking mechanism 14 through the opening 134 of the lap belt latch cover 60 until a hook end 136 of the manual ejector tool 132 engages with the manual release projections 106 of the first legs 80 of the toggle bolts 68, at which point the manual ejector tool 132 may be pulled out of the remote release locking mechanism 14, as illustrated by arrow 138, such that the toggle bolts 68 and their associated latches 84 are moved into an unlocked (e.g., unlatched) position whereby the male connector 38 may be released from the remote release locking mechanism 14, as described in greater detail herein. In certain embodiments, the manual ejector tool 132 may indeed be used as a manual replacement for the solenoids 66 described herein. In other words, the release locking mechanism 14 may instead include manual redundant latches.

Figure 22:
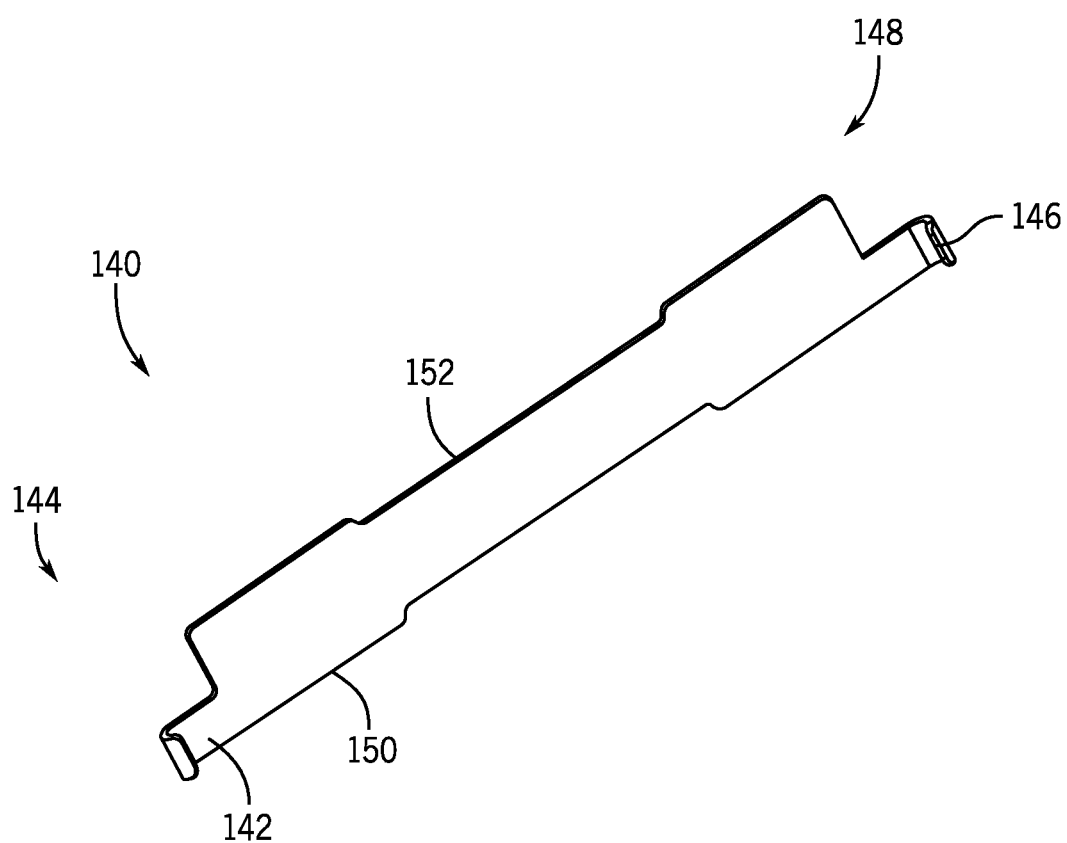
FIG. 22 is a perspective view of a maintenance test tool, in accordance with embodiments of the present disclosure.

In addition, in certain embodiments, a maintenance test tool 140 may be used to assure that the independent toggle bolts 68 of the remote release locking mechanism 14 are operable and maintaining latching redundancy. FIG. 22 is a perspective view of a maintenance test tool 140, which may be used to manually test this functionality. The maintenance test tool 140 is a relatively simple, fast, and inexpensive way to check that the latches 84 are functioning independently. As illustrated in FIG. 22, in certain embodiments, the maintenance test tool 140 may include a first hook end 142 on a first axial end 144 of the maintenance test tool 140 and a second hook end 146 on a second axial end (e.g., opposite the first axial end 144). However, the first hook end 142 and the second hook end 146 only extend axially on half of the width of the maintenance test tool 140 on a first lateral side 150 of the maintenance test tool 140, whereas the opposite half of the width of the maintenance test tool 140 on the opposite second lateral side 152 of the maintenance test tool 140 includes no hook end extending axially therefrom. As such, it will be appreciated that when the first axial end 144 of the maintenance test tool 140 is inserted into the opening 134 through the lap belt latch cover 60, the first hook end 142 will only engage one of the manual release projections 106 of the first legs 80 of the toggle bolts 68, whereas when the second axial end 148 of the maintenance test tool 140 is inserted into the opening 134 through the lap belt latch cover 60, the second hook end 146 will only engage the other one of the manual release projections 106 of the first legs 80 of the toggle bolts 68.

To manually test the functionality of the individual toggle bolts 68, one of the axial ends 144, 148 of the maintenance test tool 140 may be inserted into the opening 134 through the lap belt latch cover 60 to engage one of the manual release projections 106 of the first legs 80 of the toggle bolts 68, and once the maintenance test tool 140 has been pulled back to its end stop, the crew member 26 may ensure that the other of the latches 84 is still latched. Then, the process may be repeated by inserting the other of the axial ends 144, 148 of the maintenance test tool 140 into the opening 134 through the lap belt latch cover 60 to engage the other one of the manual release projections 106 of the first legs 80 of the toggle bolts 68.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. § 112(f). However, for any claims containing elements designated in any other manner, it is intended that such elements are not to be interpreted under 35 U.S.C. § 112(f).

The invention claimed is:

1. A restraint system, comprising:
    a restraining mechanism configured to secure a rider with respect to a ride seat, wherein the restraining mechanism comprises a first connector; and
    a remote release locking mechanism comprising a plurality of latches comprising a first, primary latch and at least one second, redundant latch, wherein the plurality of latches are configured to be individually remotely actuated to lock and unlock the first connector of the restraining mechanism relative to a second connector of the remote release locking mechanism, wherein:
        the first connector of the restraining mechanism is locked relative to the second connector of the remote release locking mechanism when at least the first, primary latch or the at least one second, redundant latch is in a locked position; and
        the first connector of the restraining mechanism is unlocked relative to the second connector of the remote release locking mechanism when both the first, primary latch and the at least one second, redundant latch are in an unlocked position.

2. The restraint system of claim 1, wherein the remote release locking mechanism comprises a plurality of toggle bolts and a plurality of solenoids, wherein each toggle bolt of the plurality of toggle bolts comprises a respective latch of the plurality of latches, and wherein each solenoid of the plurality of solenoids is configured to be individually remotely actuated to apply a force against a respective toggle bolt to individually lock and collectively unlock the first connector of the restraining mechanism relative to the second connector of the remote release locking mechanism.

3. The restraint system of claim 2, wherein each toggle bolt of the plurality of toggle bolts is configured to pivot in response to the force applied by a respective solenoid of the plurality of solenoids to move a respective latch of the plurality of latches into and out of an opening through the first connector of the restraining mechanism to lock and unlock the first connector of the restraining mechanism relative to the second connector of the remote release locking mechanism.

4. The restraint system of claim 1, comprising a handheld device configured to send control signals to the remote release locking mechanism to individually remotely actuate the plurality of latches.

5. The restraint system of claim 1, comprising a control system configured to send control signals to the remote release locking mechanism to individually remotely actuate the plurality of latches.

6. The restraint system of claim 5, comprising one or more sensors associated with the ride seat, wherein the one or more sensors are configured to detect a presence of the rider within the ride seat, wherein the control system is configured to send the control signals to the remote release locking mechanism to individually remotely actuate the plurality of latches in response to detection of the presence of the rider within the ride seat.

7. The restraint system of claim 5, wherein the remote release locking mechanism comprises one or more sensors configured to detect a latching state of one or more latches of the plurality of latches, and to send a signal to the control system indicative of the detected latching state of the one or more latches of the plurality of latches.

8. The restraint system of claim 1, wherein the remote release locking mechanism comprises an ejector mechanism configured to push the first connector of the restraining mechanism out of the second connector of the remote release locking mechanism.

9. The restraint system of claim 1, wherein the restraining mechanism comprises a lap belt, a harness, a restraint bar, or some combination thereof.

10. The restraint system of claim 1, wherein:
    the second connector of the remote release locking mechanism holds the first connector of the restraining mechanism in place within a latching channel of the remote release locking mechanism when the first connector of the restraining mechanism is locked relative to the second connector of the remote release locking mechanism; and
    the second connector of the remote release locking mechanism releases the first connector of the restraining mechanism from the latching channel of the remote release locking mechanism when the first connector of the restraining mechanism is unlocked relative to the second connector of the remote release locking mechanism.

11. An amusement park ride, comprising:
    one or more ride vehicles, wherein each ride vehicle comprises one or more ride seats, wherein each ride seat comprises:

a restraining mechanism configured to secure a rider with respect to a ride seat of the one or more ride seats, wherein the restraining mechanism comprises a first connector; and a remote release locking mechanism comprising a plurality of latches comprising a first, primary latch and at least one second, redundant latch, wherein the plurality of latches are configured to be individually remotely actuated to lock and unlock the first connector of the restraining mechanism relative to a second connector of the remote release locking mechanism, wherein:

the first connector of the restraining mechanism is locked relative to the second connector of the remote release locking mechanism when at least the first, primary latch or the at least one second, redundant latch is in a locked position; and the first connector of the restraining mechanism is unlocked relative to the second connector of the remote release locking mechanism when both the first, primary latch and the at least one second, redundant latch are in an unlocked position.

12. The amusement park ride of claim 11, wherein each remote release locking mechanism comprises a plurality of toggle bolts and a plurality of solenoids, wherein each toggle bolt of the plurality of toggle bolts comprises a respective latch of the plurality of latches, and wherein each solenoid of the plurality of solenoids is configured to be individually remotely actuated to apply a force against a respective toggle bolt to individually lock and collectively unlock the first connector of the restraining mechanism relative to the second connector of the remote release locking mechanism.

13. The amusement park ride of claim 12, wherein each toggle bolt of the plurality of toggle bolts is configured to pivot in response to the force applied by a respective solenoid of the plurality of solenoids to move a respective latch of the plurality of latches into and out of an opening through the first connector of the restraining mechanism to lock and unlock the first connector of the restraining mechanism relative to the second connector of the remote release locking mechanism.

14. The amusement park ride of claim 11, comprising a handheld device configured to send control signals to the remote release locking mechanism to individually remotely actuate the plurality of latches.

15. The amusement park ride of claim 11, comprising a control system configured to send control signals to the remote release locking mechanism to individually remotely actuate the plurality of latches.

16. The amusement park ride of claim 15, comprising one or more sensors associated with each ride seat of the one or more ride seats, wherein the one or more sensors are configured to detect a presence of the rider within the ride seat, wherein the control system is configured to send the control signals to the remote release locking mechanism to individually remotely actuate the plurality of latches in response to detection of the presence of the rider within the ride seat.

17. The amusement park ride of claim 15, wherein the remote release locking mechanism comprises one or more sensors configured to detect a latching state of one or more latches of the plurality of latches, and to send a signal to the control system indicative of the detected latching state of the one or more latches of the plurality of latches.

18. The amusement park ride of claim 11, wherein the remote release locking mechanism comprises an ejector mechanism configured to push the first connector of the restraining mechanism out of the second connector of the remote release locking mechanism.

19. A remote release locking mechanism, comprising:
a first connector;
a latching channel; and
a plurality of latches comprising a first, primary latch and at least one second, redundant latch, wherein the plurality of latches are configured to be individually remotely actuated to lock and unlock a second connector of a restraining mechanism relative to the first connector, wherein:

the second connector of the restraining mechanism is locked relative to the first connector when at least the first, primary latch or the at least one second, redundant latch is in a locked position; and the second connector of the restraining mechanism is unlocked relative to the first connector when both the first, primary latch and the at least one second, redundant latch are in an unlocked position.

20. The remote release locking mechanism of claim 19, comprising:

a plurality of toggle bolts, wherein each toggle bolt of the plurality of toggle bolts comprises a respective latch of the plurality of latches; and a plurality of solenoids, wherein each solenoid of the plurality of solenoids is configured to be individually remotely actuated to apply a force against a respective toggle bolt of the plurality of toggle bolts to individually lock and collectively unlock the second connector of the restraining mechanism relative to the first connector.

21. The remote release locking mechanism of claim 20, wherein each toggle bolt of the plurality of toggle bolts is configured to pivot in response to the force applied by a respective solenoid to move a respective latch of the plurality of latches into and out of an opening through the second connector of the restraining mechanism to lock and unlock the second connector of the restraining mechanism relative to the first connector.

22. The remote release locking mechanism of claim 19, comprising an ejector mechanism configured to push the second connector of the restraining mechanism out of the first connector.

* * * * *